United States Patent
Elliott et al.

(10) Patent No.: US 10,743,347 B2
(45) Date of Patent: Aug. 11, 2020

(54) WIRELESS TRANSMISSION IN SHARED WIRELESS MEDIUM ENVIRONMENTS USING MULTIPLE PHYS

(71) Applicant: Ossia Inc., Bellevue, WA (US)

(72) Inventors: Scott Elliott, Snoqualmie Pass, WA (US); Dale Mayes, Bothell, WA (US); Robert Giometti, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 0 days.

(21) Appl. No.: 15/992,055

(22) Filed: May 29, 2018

(65) Prior Publication Data
US 2019/0373639 A1 Dec. 5, 2019

(51) Int. Cl.
| | |
|---|---|
| *H04W 74/08* | (2009.01) |
| *H04L 29/06* | (2006.01) |
| *H04L 29/08* | (2006.01) |
| *H04W 72/04* | (2009.01) |
| *H04W 16/14* | (2009.01) |
| *H04W 84/12* | (2009.01) |

(52) U.S. Cl.
CPC ......... *H04W 74/0816* (2013.01); *H04L 69/08* (2013.01); *H04L 69/323* (2013.01); *H04W 16/14* (2013.01); *H04W 72/0453* (2013.01); *H04W 84/12* (2013.01)

(58) Field of Classification Search
CPC ............. H04W 74/0816; H04W 16/14; H04W 72/0453; H04W 84/12; H04L 69/08; H04L 69/323
See application file for complete search history.

(56) References Cited

U.S. PATENT DOCUMENTS

| | | | |
|---|---|---|---|
| 6,895,255 B1 * | 5/2005 | Bridgelall | H04L 29/06 370/329 |
| 9,402,269 B2 * | 7/2016 | Cavalcanti | H04W 74/004 |
| 9,887,589 B2 | 2/2018 | Williams et al. | |

(Continued)

OTHER PUBLICATIONS

"LTE Aggregation & Unlicensed Spectrum." 4G Americas. Nov. 2015.

(Continued)

*Primary Examiner* — Stephen J Clawson
(74) *Attorney, Agent, or Firm* — Law Office of R. Alan Burnett; R. Alan Burnett

(57) ABSTRACT

Methods, apparatus and systems supporting coexistence of wireless devices and equipment in shared wireless medium environments through the use of multiple PHYs. The techniques provided herein may be applied to various types of wireless devices and equipment. Under one example, a wireless device transmits and/or receives signals using one or more frequencies and/or channels within shared wireless medium environments in which other wireless equipment is operating, such as access points and stations in wireless local area networks (WLANs). The wireless devices are configured to coexist with the operations of the other wireless equipment within the shared wireless medium environment by adapting its transmission operations to utilize frequencies or channels that do not interfere with other equipment and/or implementing co-channel and shared channels operations under which access to channels is implemented using standardized WLAN protocols such as, but not limited to PHY and MAC protocols used for 802.11 (Wi-Fi™) networks.

22 Claims, 20 Drawing Sheets

(56) References Cited

U.S. PATENT DOCUMENTS

| | | | |
|---|---|---|---|
| 2002/0135513 A1 | 9/2002 | Paschen et al. | |
| 2003/0157951 A1* | 8/2003 | Hasty, Jr. | H04W 88/16 455/519 |
| 2005/0117530 A1* | 6/2005 | Abraham | H04W 52/0232 370/310 |
| 2005/0142957 A1 | 6/2005 | Bystrom | |
| 2006/0043915 A1 | 3/2006 | Kim | |
| 2006/0215601 A1* | 9/2006 | Vleugels | H04W 28/26 370/328 |
| 2010/0124937 A1* | 5/2010 | Vogel | G06Q 30/02 455/466 |
| 2011/0002302 A1* | 1/2011 | Ding | H04W 76/22 370/331 |
| 2013/0049732 A1 | 2/2013 | Kulkarni et al. | |
| 2013/0051446 A1 | 2/2013 | Vijayasankar et al. | |
| 2015/0334706 A1* | 11/2015 | Mukherjee | G06F 9/5027 370/329 |
| 2017/0208597 A1 | 7/2017 | Gollakota et al. | |
| 2018/0084406 A1 | 3/2018 | Tandai et al. | |
| 2018/0167949 A1* | 6/2018 | Del Carpio Vega | H04W 74/0808 |

OTHER PUBLICATIONS

Høiland-Jørgensen, Toke, et al. "Ending the anomaly: Achieving low latency and airtime fairness in WiFi." 2017 USENIX Annual Technical Conference (USENIX ATC 17). USENIX Association, Santa Clara, CA. 2017.

Joshi, Tarun, et al. "Airtime fairness for IEEE 802.11 multirate networks." IEEE Transactions on Mobile Computing 7.4 (2008): 513-527.

IEEE Std 802.11-2012: Part 11: Wireless LAN Medium Access Control (MAC) and Physical Layer (PHY) Specifications, Sections 16-18.

PCT/US19/32761 PCT International Search Report and Written Opinion of the International Searching Authority, 15 pages.

PCT/US19/29587 PCT International Search Report and Written Opinion of the International Searching Authority, 15 pages.

U.S. Appl. No. 11/968,697 Non-Final Office Action, dated Sep. 17, 2019, 23 Pages.

* cited by examiner

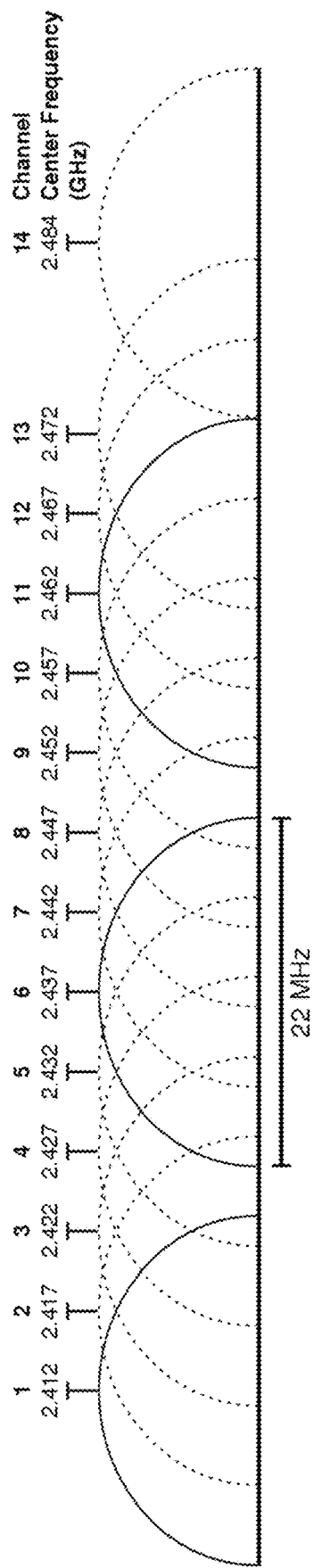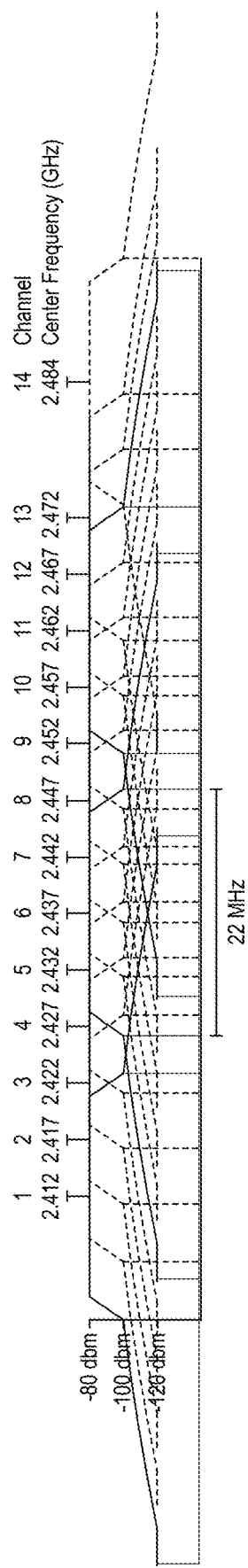
FIG. 2A (Prior Art)
FIG. 2B (Prior Art)

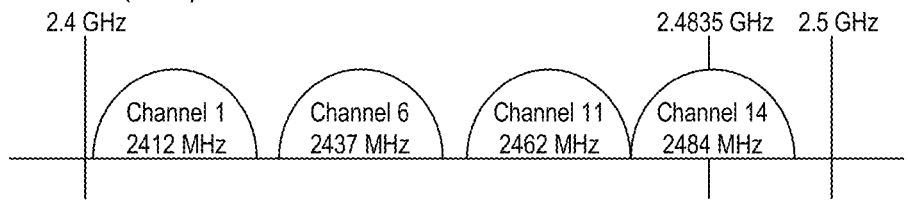
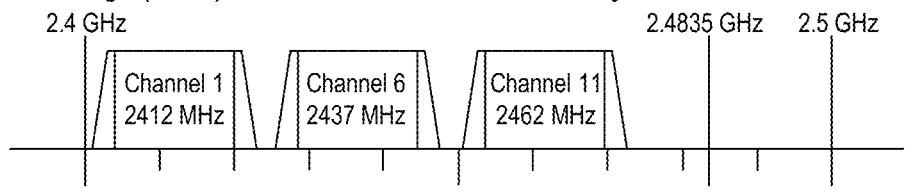
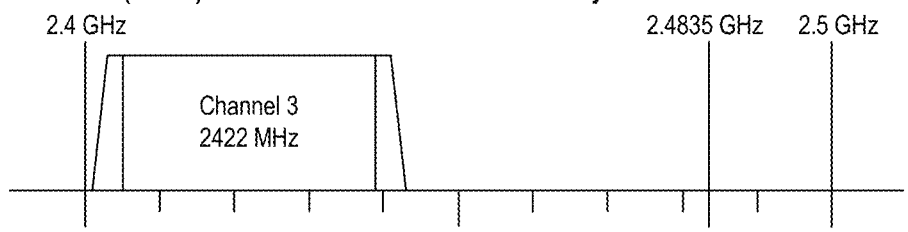
FIG. 3A *(Prior Art)*
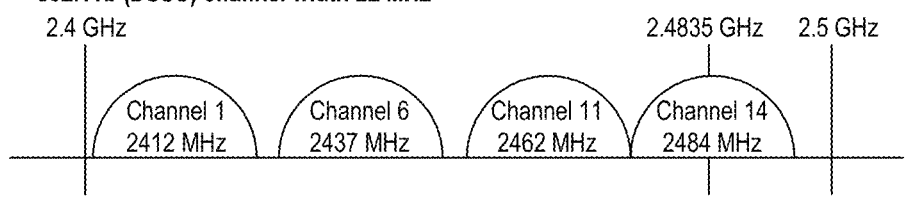
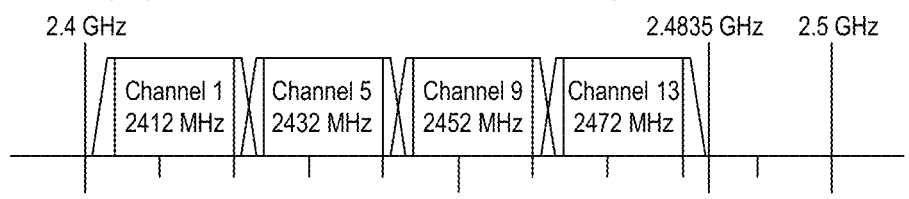
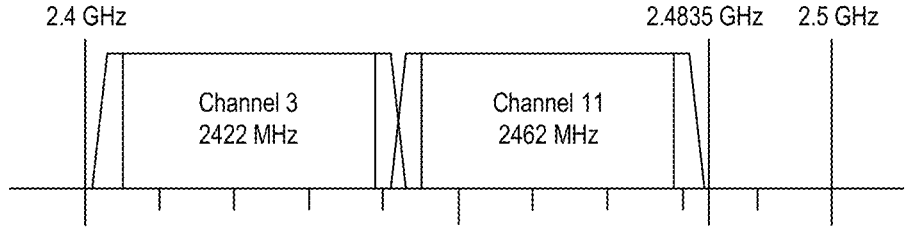
FIG. 3B *(Prior Art)*

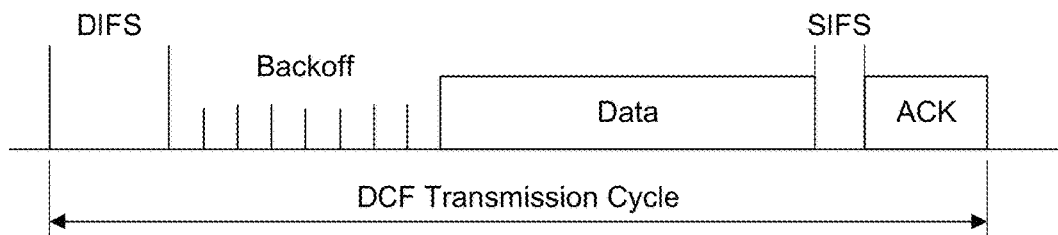
FIG. 6 *(Prior Art)*
| PHY | SIFS* | Slot Time* | PIFS | DIFS |
|---|---|---|---|---|
| HR/DSSS (802.11b) | 10 μs | 20 μs | 30 μs | 50 μs |
| ERP (802.11g) | 10 μs | Long = 20 μs<br>Short = 9 μs | Long = 30 μs<br>Short = 19 μs | Long = 50 μs<br>Short = 28 μs |
| OFDM (802.11a) | 16 μs | 9 μs | 25 μs | 34 μs |
| HT (802.11n) | 10 μs - 2.4 GHz<br>16 μs - 5 GHz | Long = 20 μs - 2.4 GHz<br>Short = 9 μs - 2.4 GHz<br>9 μs - 5 GHz | Long = 20 μs - 2.4 GHz<br>Short = 9 μs - 2.4 GHz<br>25 μs - 5 GHz | Long = 50 μs - 2.4 GHz<br>Short = 28 μs - 2.4 GHz<br>34 μs - 5 GHz |
FIG. 7 *(Prior Art)*

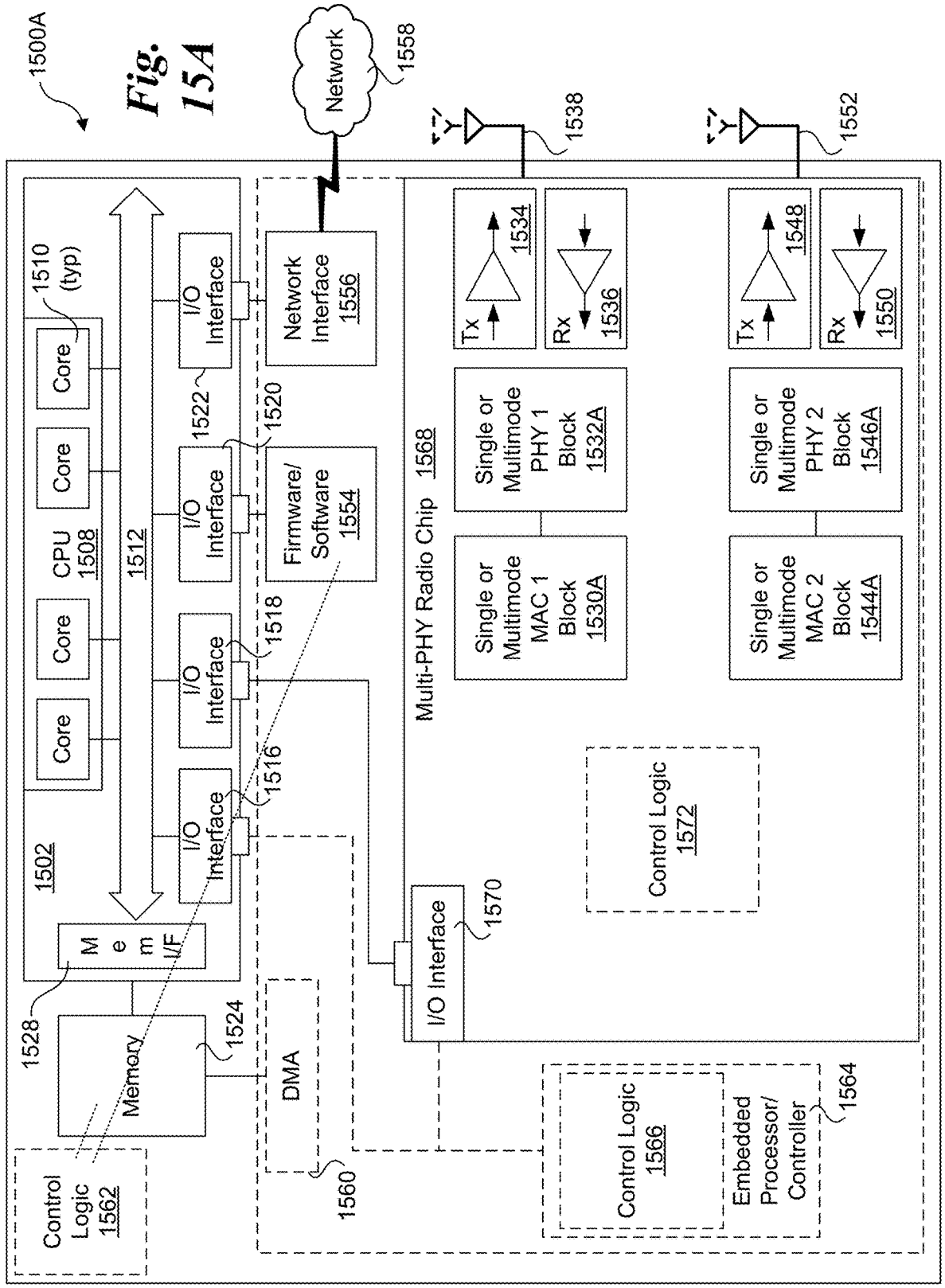

WIRELESS TRANSMISSION IN SHARED WIRELESS MEDIUM ENVIRONMENTS USING MULTIPLE PHYS

BACKGROUND INFORMATION

The use of wireless communication in today's environments is ubiquitous. It seems that everyone has at least one "smart" wireless device, such as a smart phone or tablet, and many have other types of mobile computing devices, such as laptops, notebooks, Chromebooks, etc., that support wireless communication. In addition to cellular and mobile computing, wireless communication technologies are used for other purposes, such as audio systems, portable telephone systems, screen casting, and peer-to-peer communication to name a few.

The most common wireless technologies include Wireless Wide Area Networks (WWAN) (e.g., LTE, HSPA+, UMTS, GPRS, generally associated with cellular networks), Wireless Local Area Networks (WLAN), including Institute of Electrical and Electronics Engineers (IEEE) 802.11a, 802.11b, 802.11g, 802.11n, 802.11ac standards (commonly referred to as Wi-Fi™ WLANs) and Wireless Personal Area Networks (WPAN), such as Bluetooth™. There are also wireless standards such as ZigBee™ that are used for Wireless Sensor Actor Networks (WSAN). Wireless standards are also defined for other types of wireless equipment.

The radio frequency (RF) (radio) bands used by the various wireless networks can be generally classified into two categories: licensed, and unlicensed. Most cellular networks operate in licensed bands, while most WLANs, WPANs, and WSANs operate using unlicensed bands. Some common radio bands are collectively referred to as industrial, scientific, and medical (ISM) bands, which include operations at 2.4 GHz to 2.5 GHz (commonly referred to as 2.4 GHz or 2450 MHz bands), and 5.725 GHz to 5.875 GHz (commonly referred to as 5.8 GHz or 5800 MHz bands). ISM bands generally may be used for unlicensed operation, although there are some licensed users for some of these bands. In addition, RF band operating at or near 5 GHz (commonly referred to as 5 GHz bands) are also frequently used. Wireless standards are also defined for other radio bands, generally including High Frequency (HF, 3-30 MHz), Very High Frequency (VHV, 30-300 MHz), Ultra High Frequency (UHF, 300 MHz-3 GHz), Super High Frequency (SHF 3-30 GHz), and Extremely High Frequency (EHF, 30-300 GHz).

When multiple devices are utilizing the same radio band or channel, wireless signals transmitted from a given device may interference with wireless signals transmitted from other devices. More generally, transmissions of wireless signals using Physical Layers (PHYs) utilizing the same or overlapping radio bands and/or channels present similar problems.

The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2A is a diagram illustrating the channel spacing for IEEE 802.11b and 802.11g WLANs;

FIG. 2B is diagram illustrating a spectral mask defining the permitted power distribution across each channel for IEEE 802.11g WLANs.

FIG. 3A is a diagram showing non-overlapping channels for 2.4 GHz WLANs in the United States;

FIG. 3B is a diagram showing non-overlapping channels for 2.4 GHz WLANs in most countries outside of the United States;

FIG. 6 is a diagram illustrating the Distributed Coordination Function (DCF) implemented in IEEE 802.11 WLANs;

FIG. 7 is a table illustrating various parameters relating to implementing the Distributed Coordination Function using different 802.11 PHYs;

FIG. 15A is a block diagram illustrating an alternative configuration of a wireless device configured to implement aspects of the functionality disclosed herein, in accordance with some embodiments;

DETAILED DESCRIPTION

Figure 1A:
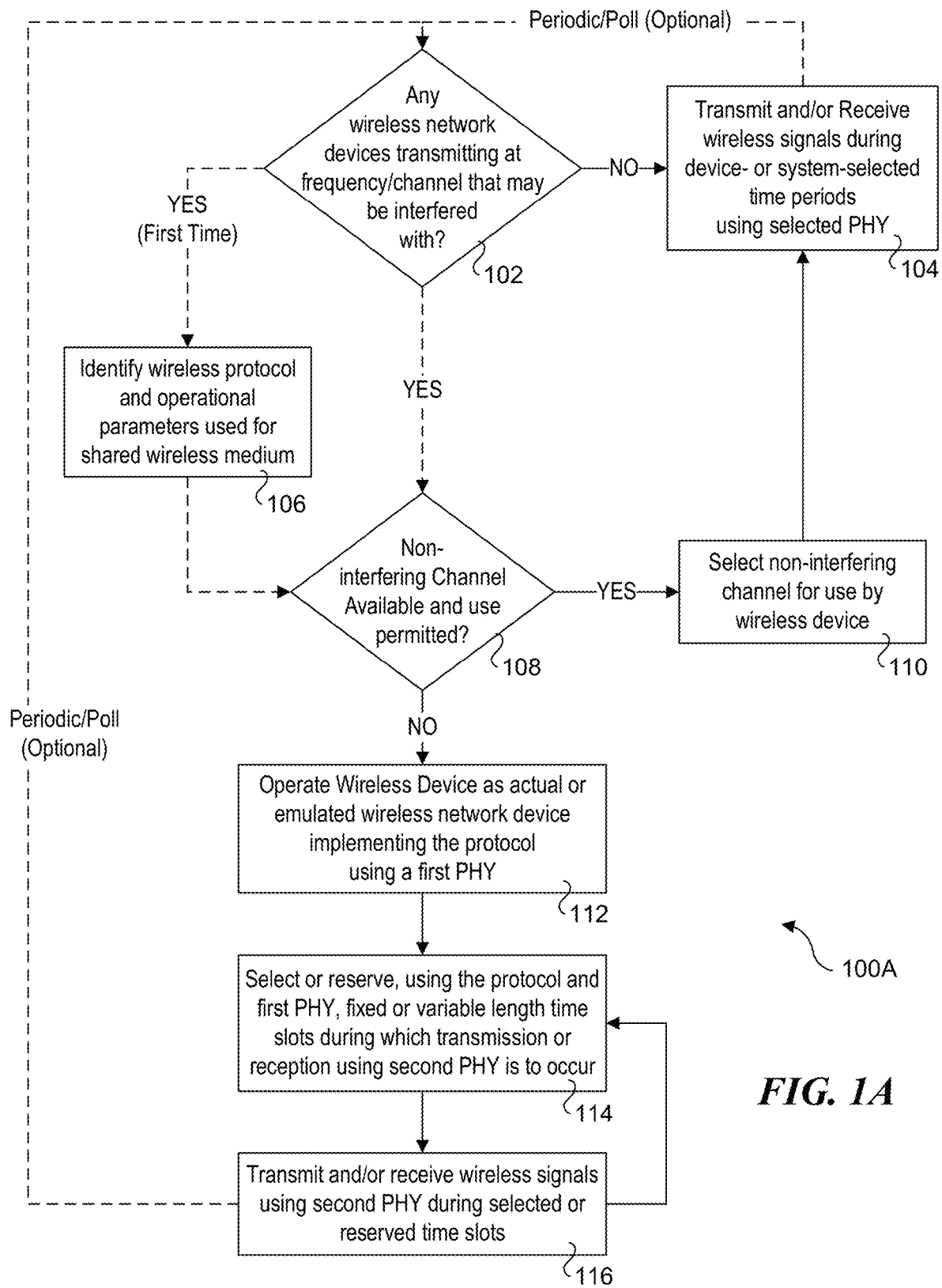
FIG. 1A shows a flowchart illustrating operations and logic for performing wireless power delivery in a manner that coexists with wireless equipment sharing the wireless medium, according to one embodiment.

Embodiments of methods, apparatus and systems supporting coexistence of multi-PHY wireless devices in shared wireless medium environments are described herein. In the following description, numerous specific details are set forth (such as implementation using IEEE 802.11-based WLANs) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

In accordance with aspects of some embodiments disclosed herein, solutions are provided that enable a wireless devices and system configured to implement multiple PHYs to coexist with other equipment operating within a shared wireless medium environment. For example, under some embodiments a wireless device is configured to transmit and receive signals in a manner that enables the wireless device to coexist with WLAN equipment utilizing one or more channels in an unlicensed radio band, such as 2.4 GHz, 5 GHz and 5.8 GHz radio bands. However, the teaching and principles disclosed herein are not limited to WLANs or these radio band, but rather may generally apply to solutions to facilitate coexistence of wireless equipment in various types of shared wireless medium environments utilizing unlicensed or licensed radio bands.

Definitions

Wireless Network: two or more nodes (i.e., wireless-enabled devices) that communicate wirelessly using RF signals that are transmitted over a shared wireless media.

PHY: Physical Layer used for transmitting signals or associated protocol operating at the Physical Layer. As used herein, a separate PHY may be implemented 1) using separate Physical Layer circuitry; and 2) using separate or common PHY transmitter and receiver circuitry using two or more different PHY protocols, whether through use of physical control hardware or software defined radio (SDR) controller mechanisms.

MAC: Media Access Channel Layer or associated protocol operating at the MAC Layer.

Radio Band: A range of RF frequencies.

Channel: A specific radio frequency or radio band used for wireless transmission.

Non-interfering Channel: Channel that uses a frequency band and/or PHY signaling that is defined or otherwise designed to not interfere with another channel; includes non-overlapping channels for IEEE 802.11 WLANs.

Co-channel networks: Two or more networks transmitting signals using the same channel.

Co-frequency networks: Two or more networks transmitting signals using the same frequency and/or operating at channels having some frequency overlap. This is similar to co-channel networks except the channel number and width for one PHY used by one network may be different to the PHY used by another network.

Reservation: A time slot reserved by a wireless network node for transmission over a particular channel.

Energy Detect (ED): Detection of RF signal energy level above a threshold for a particular wireless protocol/standard.

Shared Wireless Medium Environment: Environments in which two of more wireless devices share access to the same channel or environments including two or more wireless networks having overlapping coverage areas and operating in the same or similar radio bands (e.g., 2.4 GHz, 5 GHz, etc.)

The terms "coexist" and "coexistence" in shared wireless medium environments generally mean that equipment being operated in the shared wireless medium environment do not interfere with the operation of other wireless equipment that is operating in the environment. Non-interfering operations may generally be implemented by using a non-overlapping channel (if available), or implementing a scheme for sharing a channel (i.e., co-channel or co-frequency operation) used by another wireless network. Another aspect of coexistence relates to the concept of "fair" sharing of the medium, which is applicable when multiple networks share a channel (sharing between networks) or when multiple devices share access to the same network (e.g., WLAN stations sharing access within a WLAN). (It is noted that when networks in shared wireless medium environments are operating under non-overlapping channels, the aspect of fair sharing is met by default, since there is no need to share the channel.)

To facilitate coexistence in shared wireless medium environments, various wireless standards have been developed, including standards developed by the IEEE (e.g., IEEE 802.11 standards, IEEE 802.16 (WiMAX™), and IEEE 802.15.4 Zigbee™ standard), the Bluetooth Special Interest Group (SIG), the 3GPP (3$^{rd}$ Generation Partnership Project), and the European Telecommunications Standards Institute (ETSI), and others. Aspects of interoperability of devices implementing the IEEE 802.11a, 802.11b, 802.11g, 802.11n, 802.11ac WLAN standards are managed by the Wi-Fi Alliance™, which is a worldwide network of companies that manufacture Wi-Fi™ equipment and components.

Additional oversight may also be provided on a country or regional basis by commissions and agencies or the like. For example, in the United States, the Federal Communication Commission (FCC) has oversight over wireless device operations in both licensed and unlicensed radio bands. With respect to coexistence, the FCC has established rules for unlicensed devices that are designed to prevent harmful interference to authorized radio services through limits on transmitter power and spurious emissions. The Wi-Fi™ Bluetooth™, and Zigbee™ standards have been developed within the framework of these rules, generally with the intention of ensuring cooperative sharing of the spectrum by unlicensed devices while recognizing that such devices are not protected from interference.

In addition to the foregoing, the IEEE 802.19 Wireless Coexistence Working Group (WG) has been developing standards for coexistence between wireless technologies used by unlicensed devices. The IEEE 802.19 WG reviews coexistence assurance (CA) documents produced by working groups developing new wireless standards for unlicensed devices.

I. Coexistence of Wireless Devices in Shared Wireless Medium Environments

Wireless networks use the concept of a shared wireless medium, where in any radio frequency (RF) region, all of the wireless device share some or all of the same air space. Unlike conventional wired networks, such as Ethernet (IEEE 802.3), data transmission in wireless networks is inherently broadcast-based, being transmitted in the air as radio waves. This can lead to collisions if more than one device tries to communicate simultaneously. Wired technologies have techniques for collision detection and collision avoidance, such as CSMA/CD (Carrier Sense Multiple Access/Collision Detection) on Ethernet networks. On a wired network, if a collision is detected, packets can be resent. Conversely, in wireless networks there is no way for transmitting devices to detect a collision (with their transmissions) over the air.

Wireless networks use different approaches to address the shared-medium collision problem. For example, some wireless networks use a pre-defined time slot-based approach in combination with multiple channels. A well-known example of this is a network that employs TDMA (time-divisional multiple access), which is a channel access method for shared-medium networks. TDMA is used in digital 2G cellular networks, such as GSM (Global System for Mobile Communications). It is also used for the Digital Enhanced Cordless Telecommunication (DECT) standard for cordless phones. Both GSM and DECT combine TDMA with frequency hopping to minimize interference. Another scheme is code-division multiple access (CDMA), which employs a channel access mechanism. There are various flavors of CDMA used in mobile networks, such as IS-95, CDMA2000, wideband CDMA (W-CDMA), TD-CDMA, and TD-SCDMA. LTE (long-term evolution) cellular networks use Orthogonal Frequency Division Multiplexing (OFDM), which employs a frequency-division multiplexing (FDM) scheme used as a digital multi-carrier modulation method. OFDM is also used by some 802.11 standards, such as 802.11a, g, n and ac.

As described in further detail in the following section, WLANs use mechanisms including CSMA/CA (Carrier Sense Multiple Access/Collision Avoidance) for collision avoidance. Unlike wired Ethernet, WLANs operations are (generally) half duplex (noting this isn't strictly true for WLANs using MIMO (multiple input multiple output) radios. This means a wireless device (AP or endpoint, also referred to a client or "station") can listen (receive) or talk (transmit), but cannot do both at the same time. In addition, in any given RF region that contains multiple wireless devices, only one device can (without interference) transmit at a time. This creates challenges in using RF as a shared medium. For instance, because only one device can be transmitting at a time, a single slow device has the potential to slow down all the wireless traffic in that RF region.

A common aspect of each of the foregoing wireless networks is that its shared medium/collision avoidance scheme is implemented using one or more standardized wireless protocols specific to the wireless technology used to implement the network. These standardized protocols are designed to support interoperation with wireless devices from different manufacturers. Moreover, many of the protocols support interoperation of devices having more advanced capabilities with legacy devices having reduced capabilities.

In accordance with aspects of embodiments provided herein, method, apparatus, and systems are disclosed for implementing wireless transmissions schemes over a shared wireless medium that is concurrently used for wireless data communications in a coexisting manner. For example, the embodiments facilitate wireless transmission using the same RF channels or frequencies within or overlapping the channels implemented by existing standardized wireless networks, including WLANs and other wireless networks.

A flowchart 100A illustrating operations and logic for implementing one embodiment of the approach suitable for various radio bands and associated standard wireless protocols is shown in FIG. 1A. As depicted by the loops and associated decision blocks and operation blocks, the operations and logic of flowchart 100A are implemented in an ongoing manner (noting some of the loops are optional).

In a decision block 102, a determination is made by the wireless device to whether any wireless network devices are transmitting at frequencies and/or channels that may be interfered with by wireless signal transmissions originating from the device. To support this determination, the wireless device is configured to detect utilization of one or more standardized wireless protocols over one or more radio band in which the wireless device operates or is capable of operating. For example, if the wireless device operates in the 2.4 GHz radio (or part of the frequencies used by the wireless device is in the 2.4 GHz radio band), the wireless device will be configured to detect standardize wireless protocols that use the 2.4 GHz radio band, such as various versions of IEEE 802.11 (Wi-Fi™) networks. At the same time, the wireless device may also detect operation of wireless transmissions using a standardized wireless protocol sharing the same RF region that are either unlikely to be interfered with by the wireless device operation or the amount of interference is negligible and/or meets transmission criteria defined by applicable standardize protocols. For example, while DECT equipment utilizes that same RF region as some Wi-Fi™ networks, due to the channel-hoping nature of DECT, as well as other considerations, the Wi-Fi™ networks are operated in a manner that is agnostic to the operations of the DECT equipment. This similarly may apply to Zigbee™ network, under appropriate conditions.

If the answer to decision block 102 is NO, the logic proceeds to a block 104 in which the wireless device transmits and/or receive wireless signals during wireless device-selected time periods using a selected PHY. Essentially, this means the wireless device operates as if it is the only equipment utilizing the radio band or channel. As shown by the loop back to decision block 104, during operation in this mode the wireless device will periodically check (e.g., using polling or the like) to detect any changes in the shared wireless medium environment by re-evaluating the environment the determination made in decision block 102.

If the wireless device detects devices operating in a radio band or frequency that may be interfered with, the answer to decision block 102 is YES, and if this is the first time the other equipment is detected, the logic proceeds to a block 106 in which the protocol and associated operational parameters used for the shared wireless medium are identified. For example, for wireless protocols employing channels, one or more channels (that are in current use) may be identified. Other operational parameters may include transmission signal strength. In one embodiment, the wireless device may be part of a wireless system including one or more wireless clients (in addition to the wireless device), and one or more of the wireless clients may also be used to detect transmission signal strength and/or operational parameters. For example, many 802.11 clients are enabled to determine an RSSI (Received Signal Strength Indicator) value, which is an indication to how well the device can "hear" a signal transmitted from an 802.11 AP. In shared medium environments where a wireless device and one or more 802.11 APs are not co-located, the interference that may occur at a client device may differ from what might be determined by measurements made at the wireless device. Accordingly, in this embodiment RSSI measurements by one or more client devices may be used as inputs to how the wireless system will be operated. Further details for using wireless system clients in connection with wireless system configuration are provided below with reference to FIG. 12.

Following the operation of block 106 and for situations where the logic has already flowed through block 106 a first time, the logic next proceeds to a decision block 108 to determine if there is a non-interfering channel available. For example, some standardized wireless protocols, such as IEEE 802.11, employ multiple channels under which operation at some channels are designed to not interfere with other channels (e.g., non-overlapping channels for 802.11 WLANs). If a non-interfering channel is available, the logic proceeds to a block 110 in which the non-interfering channel is selected for use by the wireless device. The logic then returns to block 104, wherein the wireless device operates using the non-interfering channel, using a selected PHY.

If there are no non-interfering channels available, the answer to decision block 108 is NO, and the logic proceeds to a block 112 in which the wireless device is operated as an actual or emulated peer wireless network device that implements the protocol identified in block 106 and using a first PHY for transmission access purposes. In further detail, in one embodiment the wireless device does not fully implement all aspects of the protocol, but rather implements aspects of the protocol (via emulation of a peer wireless network device) to facilitate access to the channel for transmitting signals and/or communicating with wireless system clients in a manner that coexists with the operation of other equipment utilizing the shared wireless medium. In other embodiments, the wireless device may function as an actual wireless network device, such as a WLAN access point or station.

Under one embodiment, the wireless device operates as a WLAN access point, such as an 802.11 AP, as described in detail below. Optionally, the wireless device may operate as a wireless client device, such an 802.11 station under the protocol. As yet another option, the wireless device may operate as multiple client devices under the protocol, or as a combination of an (actual or emulated) access point and one or more client devices operating over multiple channels in parallel.

Next, in a block 114, fixed or variable-length time slots during which transmission or reception by the wireless device using a second PHY is to occur are selected or reserved. Generally, such time slots may be dynamically selected or reserved using random access mechanism, or reserved using a standing reservation implemented by a protocol such as slotted Aloha protocol. Wireless signals may be transmitted and received using the second PHY of the wireless device and one or more clients or peer devices in a block 116 during the time slots. The operations of blocks 114 and 116 are then repeated in an ongoing manner, as shown by the loop back from block 116 to block 114.

As shown by the optional loop from block 116 to 102, in some embodiments the wireless device periodically re-evaluates the shared wireless medium environment to detect changes in the utilization of the radio band(s) it is using for operations. For example, another wireless AP located within the signal range of the wireless device (e.g., as defined by a predetermined RSSI threshold) may begin operating, resulting in a change to the shared wireless medium environment.

In addition to wireless APs with fixed locations, many mobile phones support wireless "hot spots," under which they operate as a local 802.11 AP with (generally) reduced range (relative to fixed APs). In some embodiments, utilization of mobile wireless hot spots within the service area of a wireless device are detected, and applicable configuration changes are implemented.

Wi-Fi™ CSMA/CA for Wireless Device Interoperation

In some embodiments, the operations of block 114 will be implemented in accordance with the applicable wireless protocol that is being employed for wireless network device operation, and, as such, the determination of the time slots will be a function of both the protocol and the behavior of other devices employing the protocol. In some embodiments, one or more IEEE 802.11x protocols are used, wherein 'x' can be any of 'a', 'b', 'g', 'n', 'ac', or any other existing or future 802.11 protocol defined for use by the Wi-Fi Alliance™, also collectively referred to as Wi-Fi™ networks or WLANs.

Clear and Non-Interfering Channel Operations

There are multiple schemes that may be used to support coexisting operation of a wireless device in a Wi-Fi™ shared medium environment. As discussed above with reference to decision block 102 of flowchart 100A of FIG. 1A, a first determination is made to determine if there are any wireless networks operating in the shared medium environment that may be interfered with. In some embodiments, this determination is made using a Clear Channel Assessment (CCA) energy detection (ED) measurement.

The original 802.11 requirement for receive sensitivity was to be able to receive 2 Mbps (using DQPSK) at an RSSI of −80 dBm with a given error rate. In 802.11a and beyond, the ED threshold was set to 20 dB above the minimum receive sensitivity defined in the applicable standard.

In the original 802.11 (DSSS) standard the ED threshold was defined as:
- −80 dBm for stations using a transmit power of 100 mW or more.
- −76 dBm for stations using a transmit power of more than 50 mW
- −70 dBm for stations using a transmit power of less than or equal to 50 mW In later amendments the threshold was changed to: 802.11b (HR-DSSS): −76 dBm, −73 dBm and −70 dBm respectively following the same pattern as defined for DSSS above; and 802.11a/g/n/ac: −62 dBm (using a 20 MHz Channel).

Vendors will typically implement an ED threshold of just less than −62 dBm to be compliant across 802.11 standards. Using an ED threshold of −65 dBm is common. Thus, if the detected energy in the radio band(s) intended to be used by the wireless device is <−65 dBm, all channels (that may be used by the wireless device) are considered clear. ED may also be used for CCA within a specific channel, in which case the ED measurement is used to detect whether the channel is idle or in use. Generally, the energy detection measurement is not limited to Wi-Fi™ sources, and may include energy detection of non-Wi-Fi™ sources within the radio band(s).

A related aspect of this first scheme is to find a non-interfering channel that may be used by the wireless device in Wi-Fi™ environments. If a non-interfering channel is available (that is, a channel for which wireless device operation will meet the channel attenuation requirements per the applicable 802.11 specification), then that non-interfering channel may be used.

802.11b, 802.11g, and 802.11n-2.4 utilize the 2.400-2.500 GHz spectrum, while 802.11a, 802.11n, and 802.11ac use the 4.915-5.825 GHz band. As discussed above, these are commonly referred to as the "2.4 GHz" and "5 GHz" bands, respectively. Each RF spectrum is sub-divided into channels with a center frequency and bandwidth, wherein the channels and bandwidth differ somewhat between different versions of 802.11.

As an example, FIG. 2A illustrates the channel spacing of an 802.11b and 802.11g WLAN operating at (nominally) 2.4 GHz. As shown, the first 13 channels begin a 2.412 GHz and have a channel separation of 5 MHz. The channel separation between channels 13 and 14 is 12 MHz. As also depicted, the channels have a 22 MHz width at −95 dBm, which includes a 20 MHz signal bandwidth plus a 2 MHz gap that is used as a guard band. As further depicted in FIG. 2A and FIG. 2B, there is guaranteed channel separation for channels 1, 6, 11, and 14 (noting the channel separation between channels 11 and 14 is less than between 1, 6, and 11).

The non-overlapping channels in the United States for 2.4 GHz WLANs are shown FIG. 10A, while the non-overlapping channels for 2.4 GHz WLAN for most other countries are shown in FIG. 3B. Under IEEE 802.11n, two 20 MHz channels can be bounded to form a 40 MHz channel. When using the 40 MHz channels, non-overlapping channels are channel 3 for the US and channels 3 and 11 elsewhere (generally).

There is generally more variance in channel spacing for the 5 GHz WLAN operations, and the channels are not sequentially ordered, as shown in TABLE 1. In this table DFS=Dynamic Frequency Selection; TPC=Transmit Power Control; SRD=Short Range Devices 25 mW max power.

TABLE 1

| CHANNEL NUMBER | FREQUENCY MHZ | EUROPE (ETSI) | NORTH AMERICA (FCC) | JAPAN |
| --- | --- | --- | --- | --- |
| 36 | 5180 | Indoors | ✓ | ✓ |
| 40 | 5200 | Indoors | ✓ | ✓ |
| 44 | 5220 | Indoors | ✓ | ✓ |
| 48 | 5240 | Indoors | ✓ | ✓ |
| 52 | 5260 | Indoors/DFS/TPC | DFS | DFS/TPC |
| 56 | 5280 | Indoors/DFS/TPC | DFS | DFS/TPC |
| 60 | 5300 | Indoors/DFS/TPC | DFS | DFS/TPC |
| 64 | 5320 | Indoors/DFS/TPC | DFS | DFS/TPC |
| 100 | 5500 | DFS/TPC | DFS | DFS/TPC |
| 104 | 5520 | DFS/TPC | DFS | DFS/TPC |
| 108 | 5540 | DFS/TPC | DFS | DFS/TPC |
| 112 | 5560 | DFS/TPC | DFS | DFS/TPC |
| 116 | 5580 | DFS/TPC | DFS | DFS/TPC |
| 120 | 5600 | DFS/TPC | No Access | DFS/TPC |
| 124 | 5620 | DFS/TPC | No Access | DFS/TPC |
| 128 | 5640 | DFS/TPC | No Access | DFS/TPC |
| 132 | 5660 | DFS/TPC | DFS | DFS/TPC |
| 136 | 5680 | DFS/TPC | DFS | DFS/TPC |
| 140 | 5700 | DFS/TPC | DFS | DFS/TPC |
| 149 | 5745 | SRD | ✓ | No Access |
| 153 | 5765 | SRD | ✓ | No Access |
| 157 | 5785 | SRD | ✓ | No Access |
| 161 | 5805 | SRD | ✓ | No Access |
| 165 | 5825 | SRD | ✓ | No Access |

Figure 3C:
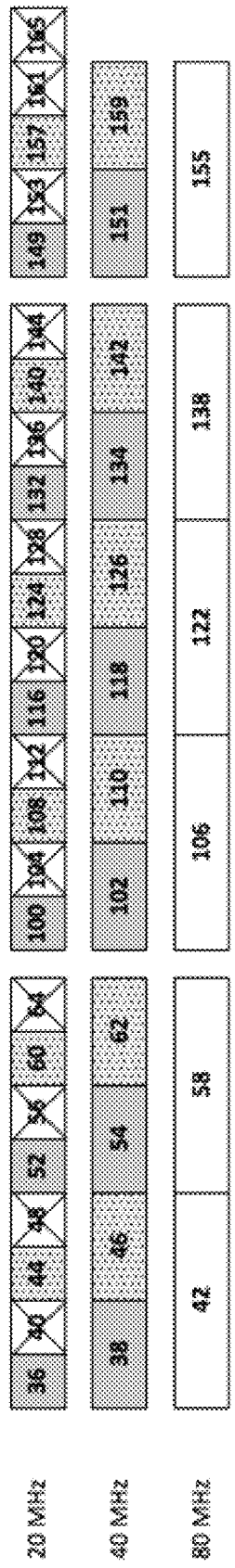
FIG. 3C is a diagram showing non-overlapping channels for IEEE 802.11ac WLANs.

With respect to channel overlap for 5 GHz operations, different channels may have different channel widths. For example, 802.11ac may use channels having widths of 20 MHz (channels 36, 40, 44, 48, 52, 56, 60, 64, 100, 104, 108, 112, 116, 120, 124, 128, 132, 136, 140, 144, 149, 153, 161, 165, 169) 40 MHz (channels 38, 46, 54, 62, 102, 110, 118, 126, 134, 142, 151, 159), 80 MHz (channels 42, 58, 106, 122, 138, 155), and 160 MHz (channels 50, 114). FIG. 3C shows the non-overlapping 40 MHz and 80 MHz 802.11ac channels.

In addition to specifying the channel center frequency, 802.11 also specifies (in Clause 17) a spectral mask defining the permitted power distribution across each channel, as shown in FIG. 9B for 802.11g. The mask requires the signal be attenuated a minimum of 20 dB from its peak amplitude at ±11 MHz from the center frequency, the point at which a channel is effectively 22 MHz wide. The result of this is that additional channels that are (nominally) overlapping may be used while meeting the attenuation requirements if the signal strength of the other channels is low enough. For instance, it may be possible to use channels 1 and 3 or 1 and 4 and meet the minimum attenuation requirements if the devices using channels 1 and 3 or 4 are spaced far enough apart. In accordance with decision block 108 and block 110 of flowchart 100A, detection and selection of a non-interfering channel may involve signal strength measurements at one or more locations in the shared wireless medium environment.

Wi-Fi™ CSMA/CA for Wireless Device Coexistence

Under some environments, a non-interfering channel may not be available. Alternatively, in other environments utilization of non-interfering channels may not be an option, as it might violate an IT policy or for other reasons. To address these situations, in some embodiments an 802.11 CSMA/CA scheme may be used. The 802.11 CSMA/CA schemes include CCA—Carrier Sense (CS)—PLCP Preamble, and CCA—MAC—Duration/ID and the Network Allocation Vector (NAV). Under CCA—Carrier Sense (CS)—PLCP Preamble, a PLCP (Physical Layer Convergence Procedure) header is used to transmit how much time is needed to transmit the data. This may be sent as a coding method and bytes or simply in microseconds (µS), but is generally sent at the lowest default mode. 6 Mbps at a signal level of −82 dBm is the minimum required receive sensitivity to meet the minimum required 802.11 standards. However, enterprise WLAN equipment have receiver sensitivities that are vastly better than this required value. For example, some WLAN equipment go lower than −95 dBm.

Aspects of CCA—MAC—Duration/ID and the Network Allocation Vector are illustrated in various Figures herein and described in detail below. Under this approach, a Duration or Duration ID indicates future traffic to allow for interframe spaces, ACKs, etc., and allows for complete frame transmission without interruption. The MAC header may also be sent at higher rate and/or at a different rate than the data that follows.

As discussed above, Wi-Fi™ stations cannot detect collisions over the air. To address this, IEEE 802.11 protocol define a "randomized access" medium contention approach. Technically, this is called p-persistent CSMA, where "p" indicates the probability of transmission when the medium is found to be idle after it was previously busy (perhaps due to a previous frame transmission). Randomized network access is beneficial when multiple stations have queued traffic awaiting transmission, yet the medium is busy. The previous frame transmission and access deferral serve to align subsequent transmission attempts by multiple stations, and without randomized access, there is a much higher probability of frame collisions. Coupled with the inability to detect collisions over the air, multiple stations would continue transmitting at the same time for the full length of the frame, wasting large amounts of airtime and causing significant network overhead.

Figure 4:
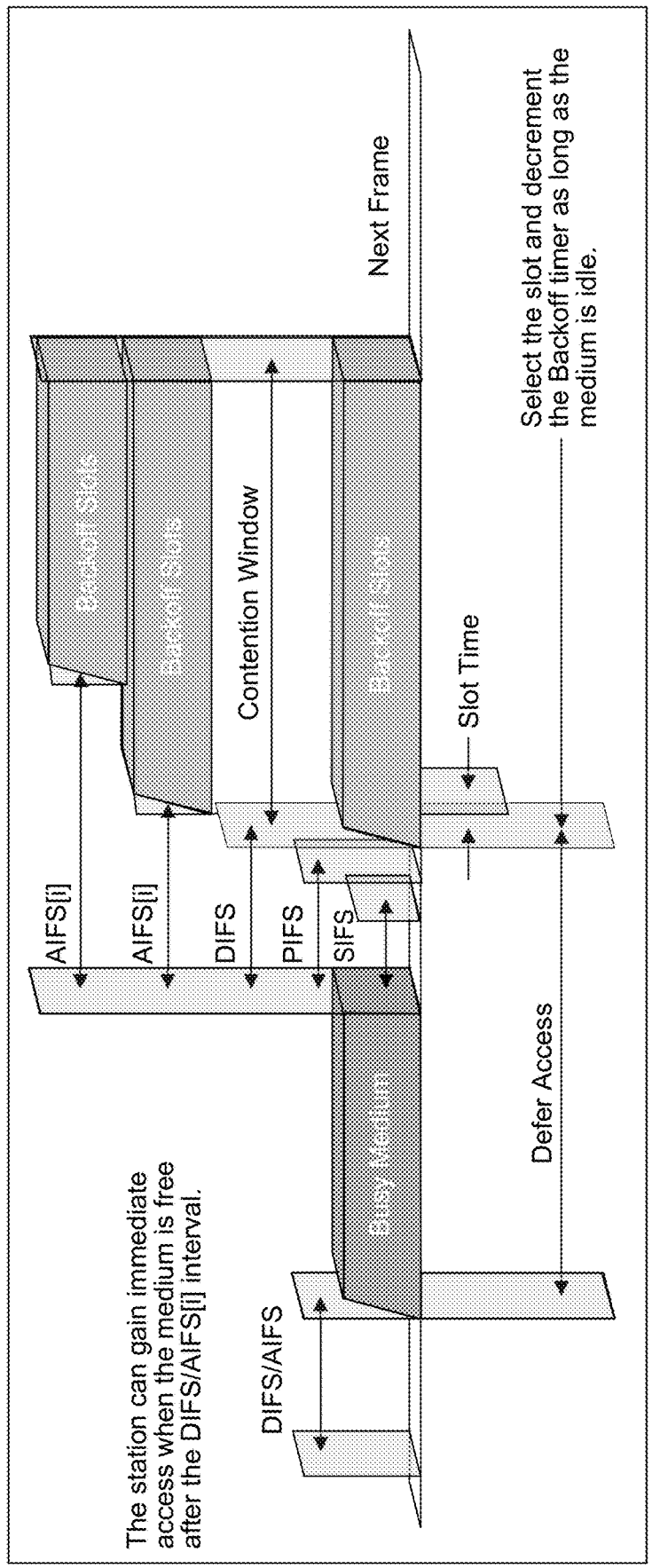
FIG. 4 is a diagram illustrating an IEEE 802.11 WLAN collision avoidance mechanism.

Wi-Fi™ collision avoidance mechanisms include interframe spacing for different high-level frame types (for instance, control versus data frames) and a contention window to introduce randomness into the distributed medium contention logic of radio transmitters since there is no central source of coordination between Wi-Fi™ stations. Aspects of this scheme are depicted in FIG. 4.

In a manner similar to Ethernet, Wi-Fi™ WLANs transfer data via packets encapsulated in frames. Inter-frame spacing provides priority access for a select few types of control frames necessary for proper network operation. The Short InterFrame Spacing (SIFS) value is used for acknowledgements that must directly follow the previous data frame; Distributed Coordination Function (DCF) InterFrame Spacing (DIFS) is used for non-QoS (Quality of Service) data frames; Arbitrated InterFrame Spacing (AIFS) is used for QoS data frames and is variable based on the Wi-Fi™ Multimedia (WMM) Access Category (AC) to which the frame is assigned.

Before frame transmission, Wi-Fi™ stations select a random timer value within the contention window range and countdown until the timer expires (unless the medium was idle immediately prior, in which case the contention window timer may be skipped). Only then are stations allowed to transmit the frame if the medium is still idle. If a collision occurs (as implied by the absence of an acknowledgement frame), then the transmitting stations double the contention window size to reduce the probability of a subsequent collision, up to a fixed maximum contention window size. This is called Truncated Binary Exponential Backoff. The initial small contention window size is referred to as the Contention Window Minimum (CWMin) and the capped maximum size is referred to as Contention Window Maximum (CWMax). When WMM QoS is in use, both interframe spacing and the contention window size vary based on the WMM AC to which the frame belongs, providing a statistical advantage for higher priority traffic over lower priority traffic. This method of probability-based medium contention introduces a large amount of network overhead to minimize the possibility of a frame collision.

Since Wi-Fi™ stations cannot directly detect collisions over the air and because the medium is not reliable, which can result in frame loss or corruption due to various sources of signal attenuation or RF interference, various versions of the 802.11 protocol specify use of positive frame acknowledgments. Under this scheme, the receiving station sends back a short acknowledgment frame to the transmitting station, indicating successful reception of the immediately preceding data frame. However, since there is an acknowledgement for each transmission, positive frame acknowledgement is a large source of network overhead on Wi-Fi™ networks. 802.11n and 802.11ac stations can minimize both medium contention and acknowledgement overhead by using frame aggregation and block acknowledgements, which allow the transmitting station to send multiple data frames at once and receive one acknowledgement from the receiver. By eliminating the need to acknowledge each individual frame, more network capacity is available for data transmission, resulting in better system performance. This is due, in part, to the half-duplex nature of 802.11, which relies on the same channel (frequency) for bi-directional communication. The block acknowledgement indicates which frames were received successfully and which were not, allowing selective retransmission of only the frames that were not properly received (similar to TCP selective acknowledgements at Layer 4 in the OSI model).

Operation Supporting Legacy WLAN Stations 802.11 specifies protection mechanisms that provide backwards compatibility to ensure the coexistence of older WLAN stations with newer ones as well as to ensure all Wi-Fi™ stations on the channel are made aware of a pending frame transmission and defer access to prevent frame collisions, reducing hidden node problems. Such backwards compatibility is necessary because stations that only implement earlier 802.11 protocols (e.g., 802.11a and 802.11b) cannot interpret transmission at higher data rates by stations implementing more recent 802.11 protocols (e.g., 802.11g, n, or ac) due to different modulation and encoding techniques. Therefore, newer stations need to transmit RTS/CTS (Request to Send/Clear to Send) or CTS-to-Self control frames at the legacy data rate before transmitting their higher-speed data frames. RTS/CTS ensures that all stations receive the frame and appropriately set their NAV (which is a type of internal back-off timer) to defer transmission for the length of time indicated for completion of the subsequent higher-speed data frame transmission. The use of the NAV supports Virtual Carrier Sense under which the other stations are enabled to determine how much time the channel will be busy following the RTS/CTS exchange.

Most modern 802.11 stations automatically implement CTS-to-Self mechanisms for protection when the AP indicates that older stations are associated or detected within range. Generally, RTS/CTS must be manually enabled, but is more thorough in protecting a frame transmission from collision because it prevents hidden node issues and allows all stations within the AP range to hear the CTS frame when it is transmitted by the AP. As illustrated in flowchart 100B of FIG. 1B and described below, RTS/CTS will be used by a wireless device to provide legacy support, if needed, or, alternatively, may be selectively activated.

Figure 5:
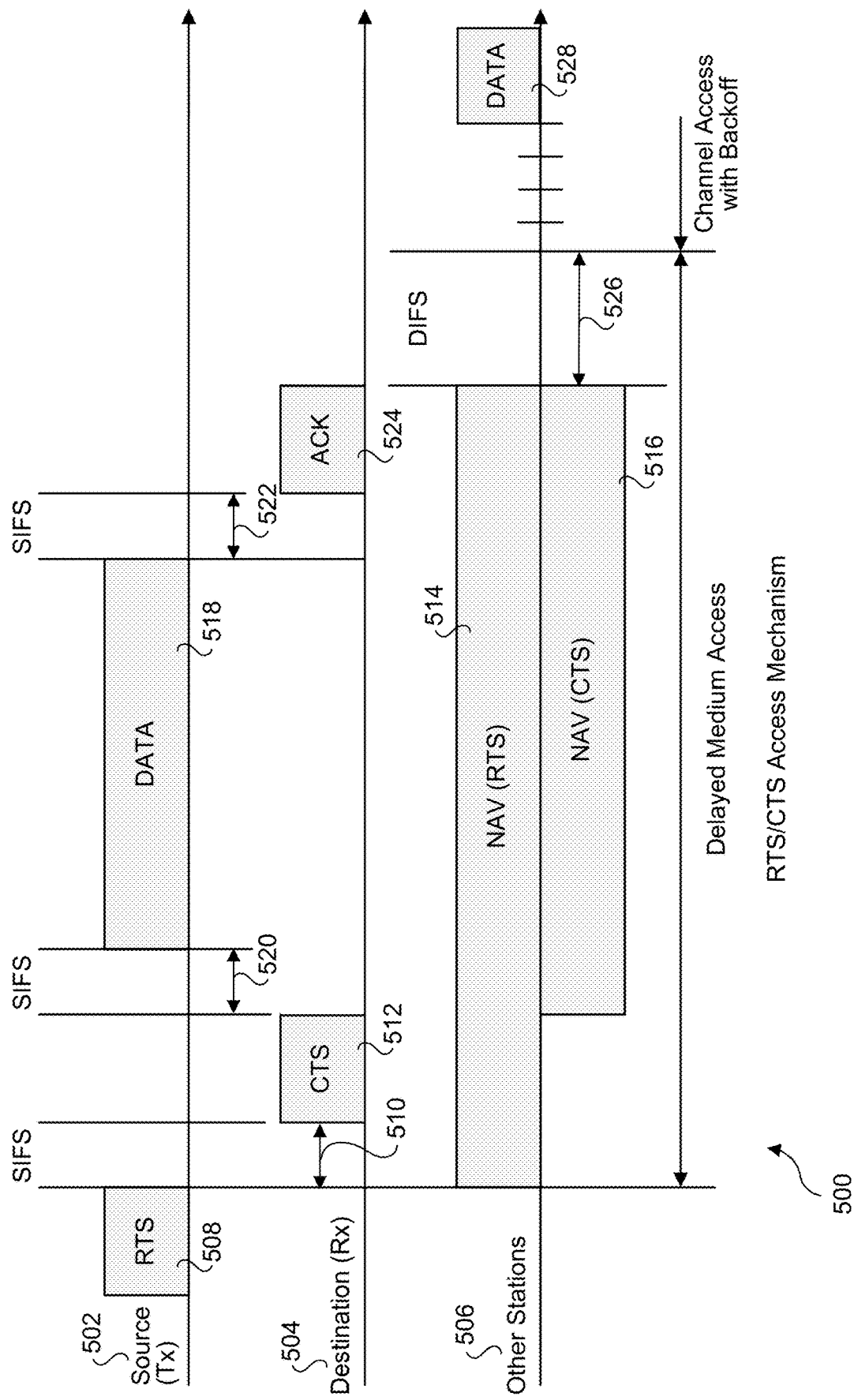
FIG. 5 is a diagram illustrating the IEEE 802.11 Request to Send/Clear to Send channel reservation and access algorithm.

The foregoing operations are schematically illustrated in diagram 500 of FIG. 5. Diagram 500 depicts operations performed by a source (transmitter) 502, a destination (receiver) 504, and other stations 506. The sequence starts with source 502 detecting an idle channel, followed by transmitting a request to send (RTS) frame 508. The RTS frame contains five fields, including a frame control, duration, receiver address (RA), transmitter address (TA), and frame check sequence (FCS). The TA identifies source 502 as the station transmitting the RTS and the RA identifies destination 504 as the station to which the data (to be sent) following the RTS/CTS sequence is destined. After the RTS message has been transmitted, a first SIFS period 510 occurs, followed by destination 504 returning a clear to send (CTS) frame 512 to source 502. The CTS frame includes a frame control, duration, RA, and FCS.

Meanwhile, operations are performed by the other stations in parallel. As discussed above, the RTS frame 508 includes a duration, which corresponds to a timeframe during which the shared medium will be in use. Accordingly, a NAV (RTS) 514 is generated for each of the other stations 506. Similarly, a NAV (CTS) 516 is generated upon completion of the CTS frame 512.

Returning to the operations of source 502 and destination 504, source 502 transmits a DATA frame 518 following a second SIFS period 520. Details of various 802.11 data frame formats are discussed below. DATA frame 518 includes various fields (discussed below in further detail) including a data (payload) field containing the data being transmitted to destination 504. Following transmission of DATA frame 518 is a third SIFS period, followed by an acknowledgment (ACK) frame 524 returned by destination 504 to source 502.

As illustrated, the end of NAV (RTS) 514, NAV (CTS) 516, and ACK frame 524 are configured to coincide in time. In practice, each of the other stations implements a countdown timer that is set to an initial count value corresponding to the durations fields of RTS frame 508 and CTS frame 512, respectively. At the expiration of the countdown time, each of the other stations 506 listen for an idle medium during a DIFS period 526. Subsequently, a random channel access with backoff is implemented followed by transmission of a DATA frame 528.

Distributed Coordination Function

An illustration of the Distributed Coordination Function (DCF) used by 802.11 WLANs is shown in FIG. 6. The transmission cycle of DCF ($T_{DCF}$) consists of DIFS time ($T_{DIFS}$), backoff time ($T_B$), data transmission time ($T_{DATA}$), SIFS time ($T_{SIFS}$) and ACK transmission time ($T_{ACK}$):

$$T_{DCF}=T_{DIFS}+T_B+T_{DATA}+T_{SIFS}+T_{ACK} \tag{1}$$

The backoff time TB is a function of a random*time slot with binary exponential backoff:

$$\frac{1}{N+1}\sum_{i=0}^{N}i \tag{2}$$

Examples of various values for SIFS, Slot Time, PIFS, and DIFS for different 802.11b, 802.11g, 802.11a, and 802.11n PHY (Physical) layers are shown in FIG. 5. Under 802.11 embodiments disclosed herein, the backoff time that is to be implemented will be a function of the applicable 802.11 PHY that is detected (e.g., detected in block 106 of flowchart 100A).

Figure 8:
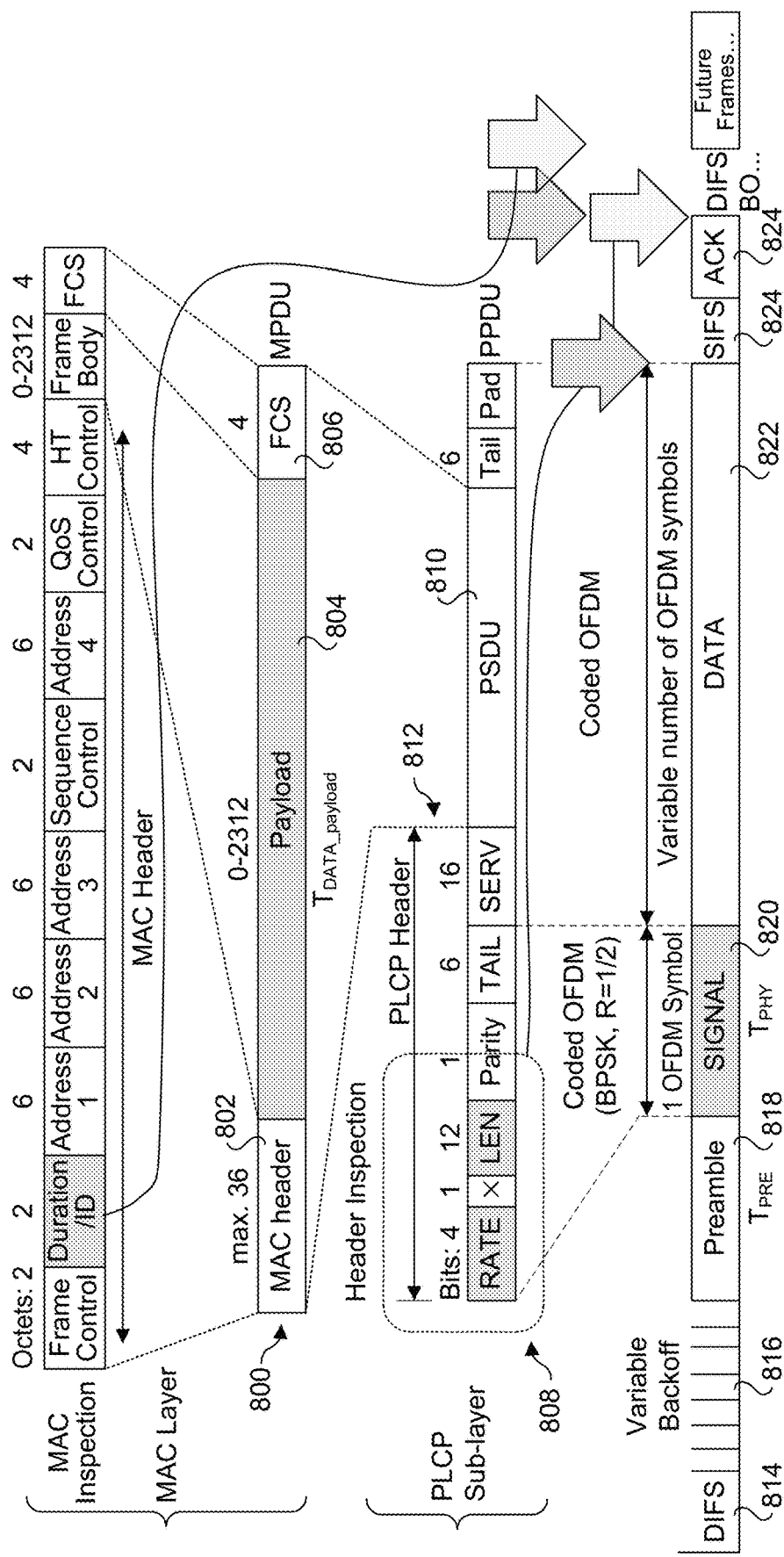
FIG. 8 is a diagram illustrating frame formatting implemented for IEEE 802.11n at the MAC layer and the PLCP sub-layer, along with how the PLCP Protocol Data Units (PPDU) are transmitted using the IEEE 802.11 DCF.

The upper portion of FIG. 8 depicts an IEEE 802.11n MAC frame format, which includes a MAC Protocol Data Unit (MPDU) 800 at the MAC layer. MPDU 800 includes a MAC header 802, a payload 804 having a size of 0-2312 Bytes, and a 4-Byte Frame Control Sequence (FCS) 806. MAC header 1502 comprises a 2-octet frame control field, a 2-octet Duration/connection ID field, three 6-octet (48-bit) addresses fields, a 2-octet sequence control field, a fourth 6-octet address field, a 2-octet QoS control field, a 2-octet HT control field.

The 802.11 PHY is divided into two sublayers
1. PLCP (Physical Layer Convergence Procedure) sublayer
2. PMD (Physical Medium Dependent) sublayer The PLCP sublayer prepares the frame for transmission by taking the frame from the MAC layer and creating a PLCP Protocol Data Unit (PPDU) 808. The PMD sublayer (not shown) then modulates and transmits the data as bits. When the MPDU 800 is handed down to the physical layer it is referred to as PLCP Service Data Unit (PSDU) 810. When PLCP receives the PSDU, it prepares the PSDU to be transmitted and creates the PPDU. The PLCP sublayer also adds a preamble and PHY header to the PSDU (collectively depicted as PLCP header 812). The PLCP header includes a 4-bit RATE field defining a transmission rate to be used, a 1-bit reserved field, a 12-bit length (LEN) field defining a length in bytes of the transmission (to follow), a 1-bit parity field, a 6-bit tail, and a 16-bit service (SERV) field. Based on the rate and the length information, 802.11a/g/n/ac receiving stations can determine how long the channel will be busy.

For stations using legacy DSSS (802.11) and HR-DSSS (802.11b) radios, the PLCP Header is preceded by a Start of Frame Delimiter of 16 bits (not shown in FIG. 8). The DSSS/HR-DSSS PLCP Header contains a Length Field defining the period of time in microseconds that the channel will be busy for (as opposed to the length in bytes uses by 802.11a/g/n/ac stations).

The lower portion of FIG. 8 shows how a PPDU is sent using the Distributed Coordination Function. As illustrated, the transmission sequence begins with a DIFS period 814, followed by a variable backoff (BO) 816. A transmit preamble 818 is then broadcast, followed by a signal 820 composed of one OFDM symbol. Signal 820 includes all of the fields in the PLCP header 812 except for the service field. Data 822 is then transmitted, which will use a variable number of OFDM symbols, with the number of symbols being a function of the amount of payload data 804. As further shown, data 822 is composed of the 16-bit service field, PSDU 810, the 6-bit tail, and any padding. After data 822 is transmitted, the medium is idle for a SIFS period 824, followed by an ACK frame 824. This sequence is then repeated in an ongoing manner.

Figure 8A:
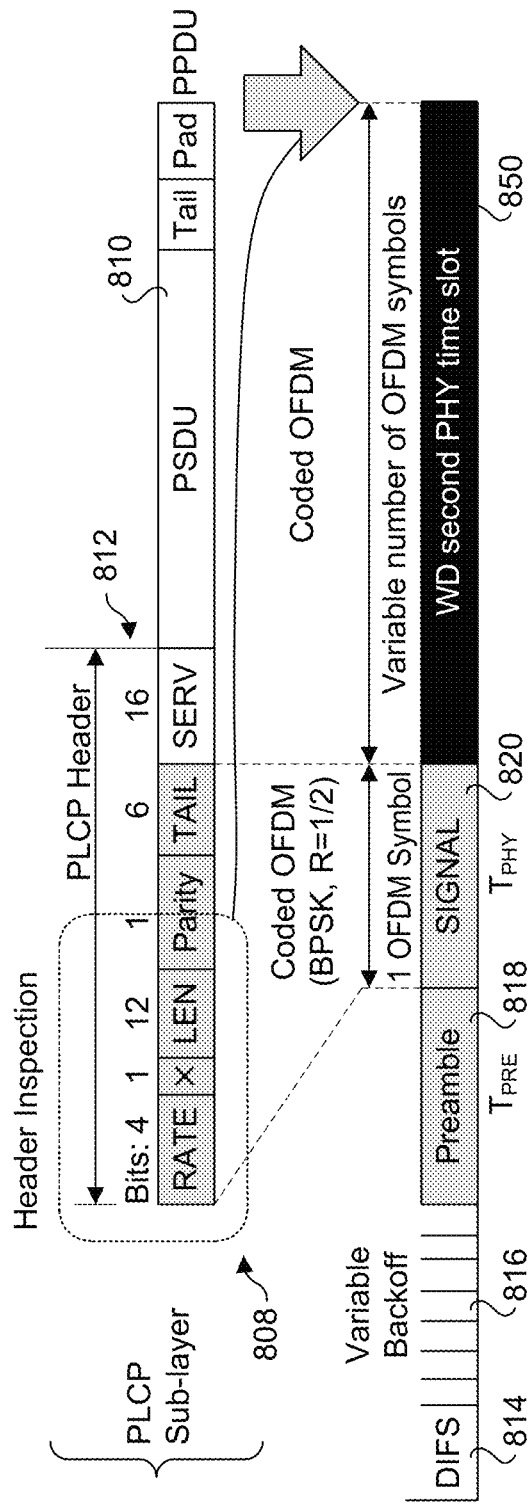
FIG. 8A is a diagram illustrating a modified implementation of the diagram of FIG. 8 under which time slots selected using the IEEE 802.11 PLCP protocol are implemented as wireless device second PHY time slots.

In some embodiments the wireless device operates as an emulated 802.11 access point and the wireless device and wireless system clients access the shared wireless media during time slots that are identified (selected or reserved) using the applicable 802.11 protocol version. For example, as shown in FIG. 8A, the wireless device is operating under the 802.11n protocol to obtain access to the channel. In other embodiments, the wireless device operates as an actual 802.11 access point that is augmented to support the additional functionality disclosed herein. For example, a wireless device may operate as a Wi-Fi™ access point for communicating with wireless system clients.

As illustrated, the timing diagrams and layers are similar in FIGS. 8 and 8A, including the PLCP sub-layer and the use of the Distributed Coordination Function. The portions of the timing diagram shown in gray in FIG. 8A indicate the wireless device is operating under the 802.11n protocol using a first PHY in the conventional manner. However during the period data 1522 would be transmitted under the 802.11n protocol shown in FIG. 8, the wireless has access to the shared wireless medium utilizing a second PHY, as depicted by a WD (wireless device) second PHY time slot 850 in FIG. 8A.

During a WD second PHY time slot, the wireless device has access to the channel (or utilizing frequencies within or overlapping the channel) and can utilize the time slot for wireless device purposes using a second PHY. During a given WD second PHY time slot, the wireless device may transmit signals to the wireless clients. In addition, the wireless device may also send data to the wireless clients and/or receive data from the wireless clients during a WD second PHY time slot. For example, a given WD second PHY time slot may entail a pair of communications between a wireless device and a wireless client, followed by transmission of signals during the remainder of the WD second PHY time slot, or the order may be reversed, where the signals are transmitted during the first portion of the WD second PHY time slot.

The foregoing operations are different than conventional 802.11 operation in several respects. First, under conventional 802.11 operations, a wireless device or wireless device client (operating as a WLAN station) could only transmit during a time slot selected or reserved by the device/client using the applicable 802.11 protocol. Second, during a wireless device second PHY time slot, the wireless device may transmit signals during the time slot without following the PLCP sublayer format of a 16-bit service field, followed by PSDU 810, and then followed by a tail and a pad (i.e., any padding). Rather, the entire time slot may be used by the wireless device for its own purposes.

As another augmentation to conventional 802.11 operation, when a positive acknowledgment scheme is being implemented for 802.11 communications, there is no need to acknowledge signals transmitted by a wireless device, in some implementations. As a result, the wireless device second PHY time slot can be extended to use any following (the transmission of data) time allocated for the channel for positive ACKs.

Figure 9:
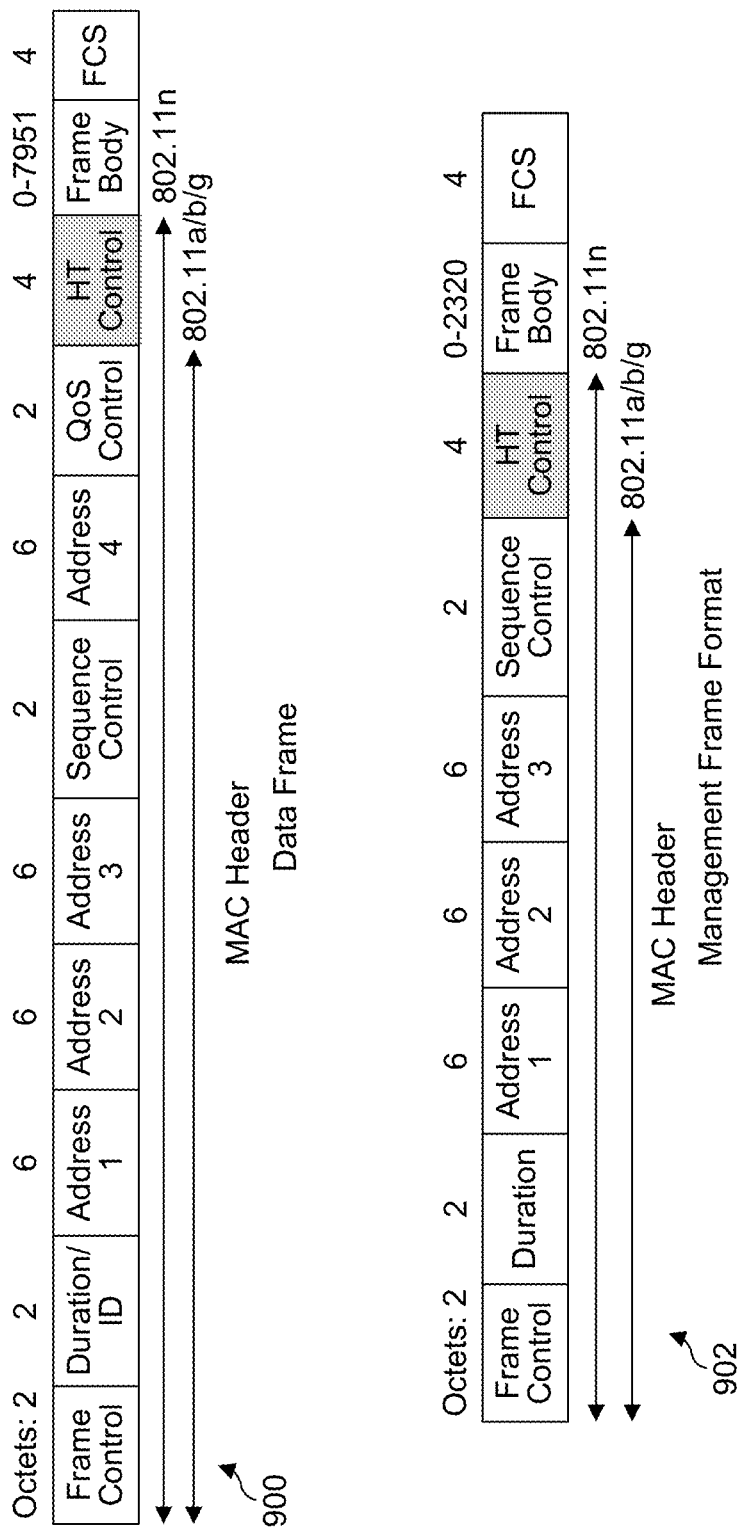
FIG. 9 is a diagram illustrating IEEE 802.11 MAC data frame and management frame formats.

FIG. 9 shows examples of an 802.11 MAC data frame format 900 and MAC management frame format 902. For 802.11a/b/g, the MAC header for the data frame includes a frame control field, Duration/connection ID field, three address fields, a sequence control field, fourth address field, and a QoS control field. The MAC header for the 802.11a/b/g management frame includes a frame control field, a Duration field, three address fields, and a sequence control field. As shown, the MAC headers for each of the data frame and management frame formats for 802.11n further includes a 4-octet HT control field.

Figure 10:
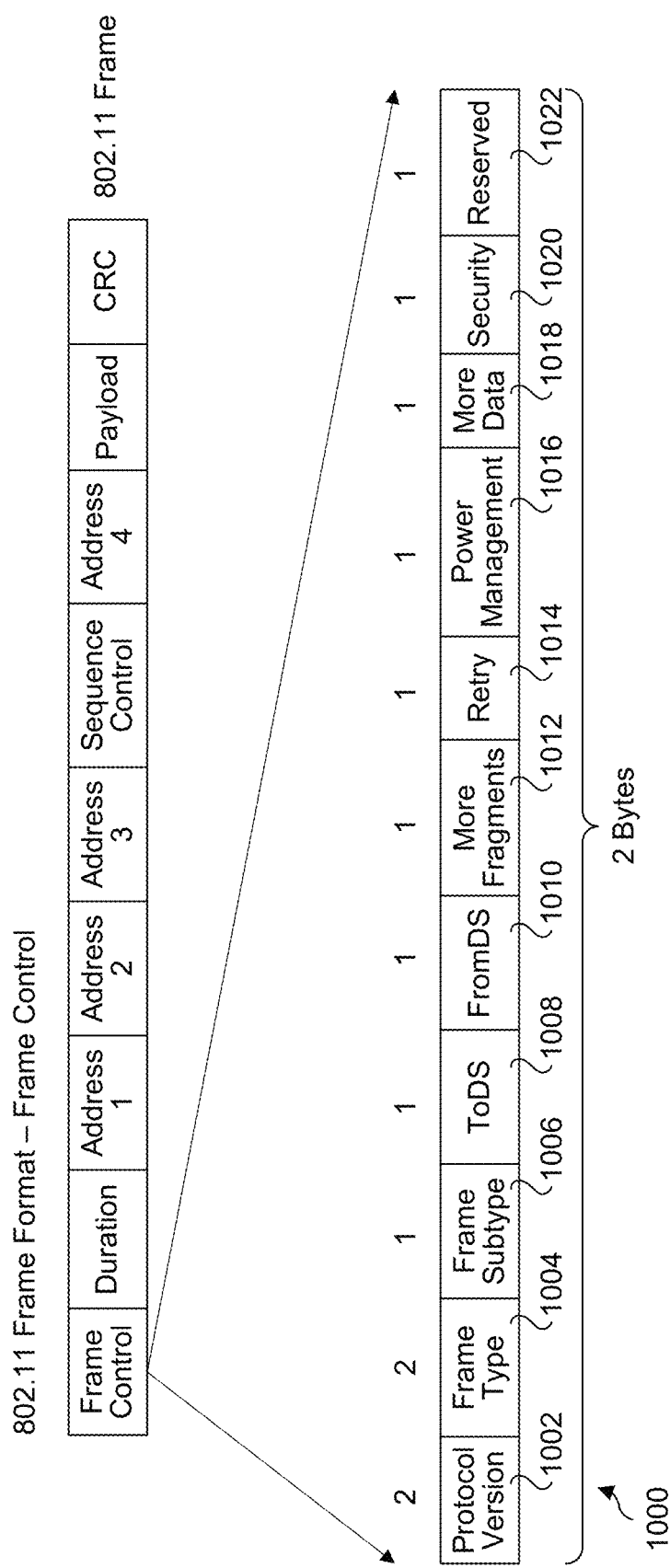
FIG. 10 is a diagram illustrating the IEEE 802.11 Frame Control format.

FIG. 10 shows further details of the frame control field 1000 of an 802.11 frame. The fields/flags include a 2-bit protocol version field 1002, a 2-bit frame type field 1004, a 4-bit frame sub-type field 1006, a ToDS bit 1008, a FromDS bit 1010, a more fragments bit 1012, a retry bit 1014, a power management flag 1016, a more data bit 1018, a 1-bit security bit 1020, and a reserved field bit 1022.

Figure 11A:
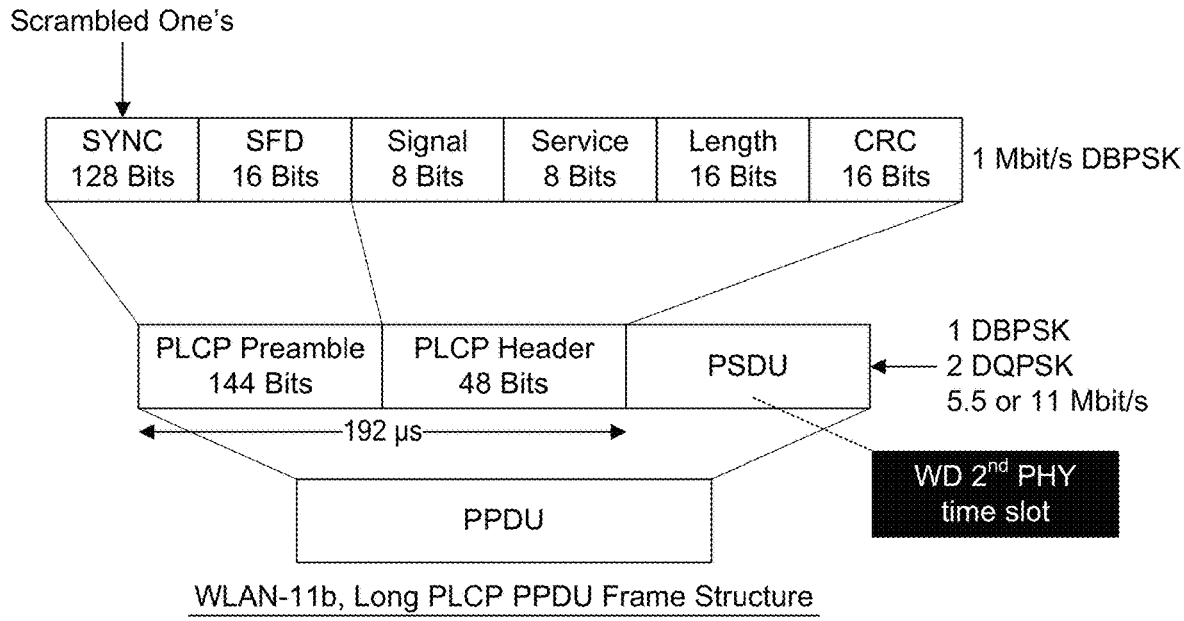
FIG. 11A is diagram illustrating implementation of wireless device second PHY time slot using an IEEE 802.11b long PLCP PPDU frame structure.
Figure 11B:
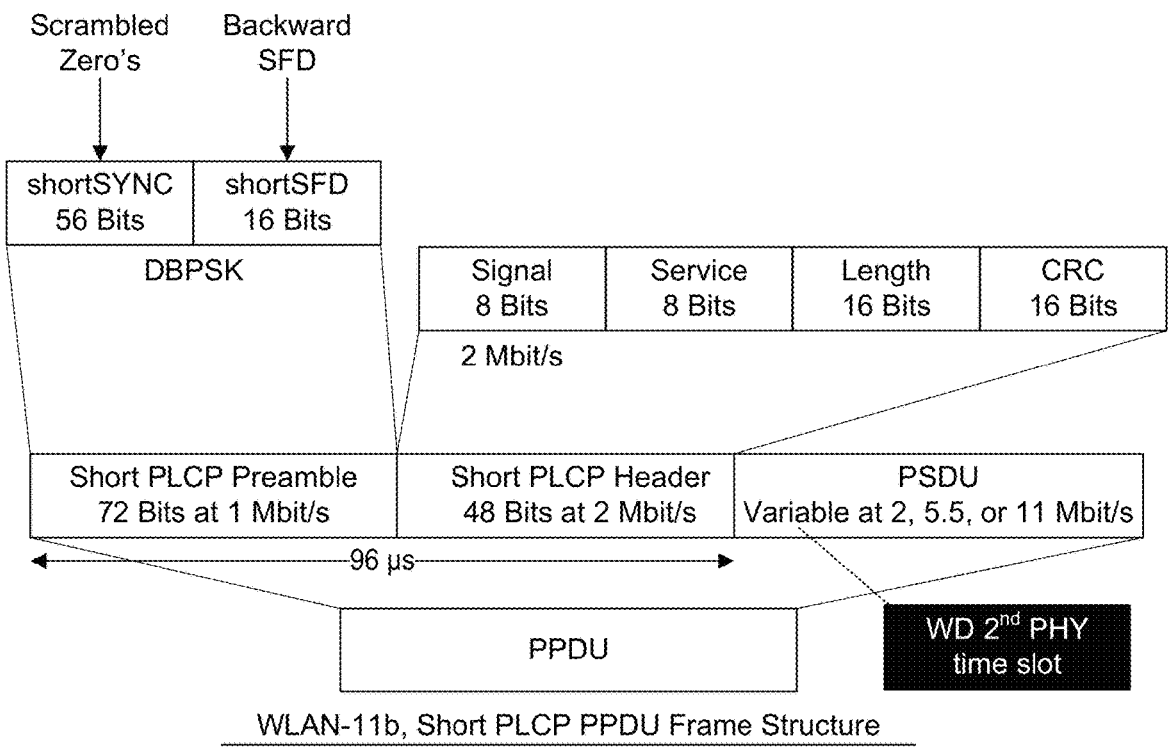
FIG. 11B is diagram illustrating implementation of wireless device second PHY time slot using an IEEE 802.11b short PLCP PPDU frame structure.

FIGS. 11A and 11B respectively illustrate the long and short PLCP PPDU frame structures for 802.11b WLANs. Under the long PLCP PPDU frame structure of FIG. 11A, the PLCP preamble is 144 bits, and the PLCP header is 48 bits, followed by a variable-length PSDU. The short PLCP PPDU frame structure has a PLCP preamble of 72 bits with the same 48-bit PLCP header as the long PLCP PPDU frame structure. Under both frame structures, the preambles are transmitted at 1 Mbits/s and the PLCP headers are transmitted at 2 Mbits/s. Under the long PLCP PPDU frame structure, the PSDU can be transferred at 1, 2, 5.5, or 11 Mbits/s. For the short PLCP PPDU frame structure, the PSDU can be transferred at 2, 5.5, or 11 Mbits/s.

Figure 1B:
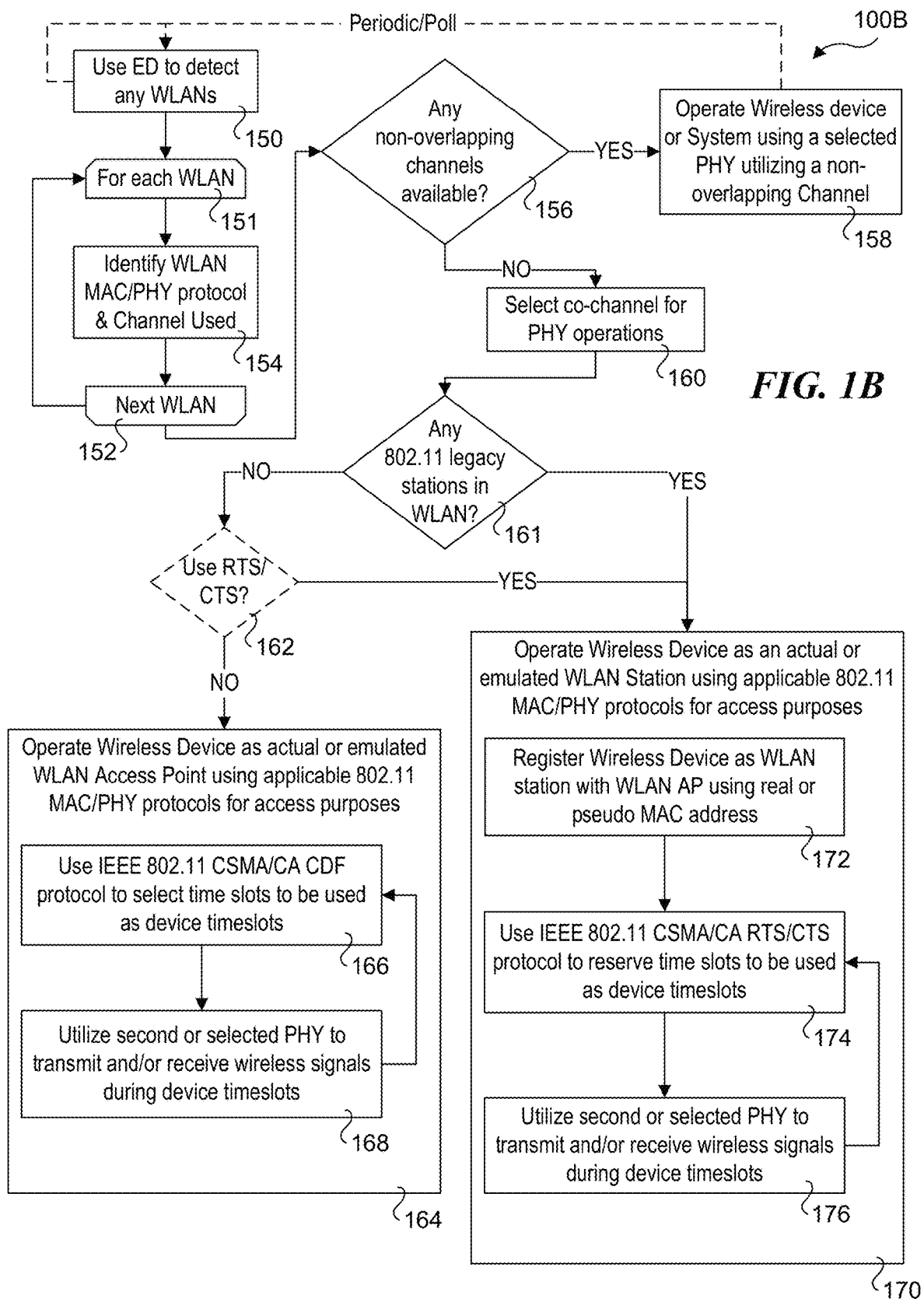
FIG. 1B shows a flowchart illustrating operations and logic for performing wireless power delivery in a manner that coexists with IEEE 802.11 WLANs, according to one embodiment.

FIG. 1B shows a flowchart 100B that may be used by a wireless device to support coexistence in shared wireless medium environments including one or more 802.11 WLANs, according to some embodiments. Generally, some of the operations of flowchart 100B may be implemented in associated operations in flowchart 100A described above and illustrated in FIG. 1A.

In a block 150, ED is used to detect the existence of any WLANs operating within the wireless environment used by the wireless device (i.e., within the wireless device operational environment). The operation of block 150 may also be performed periodically to detect changes to the wireless device operational environment, such as to detect the addition or removal of a WLAN within the wireless device operational environment. If one or more WLANs are detected within the frequency range the wireless device may utilize for transmitting signals, then the wireless device operational environment is a shared wireless media environment (i.e., the wireless media (airspace) is being shared by multiple wireless systems and/or networks.)

Presuming one or more WLANs are detected, the WLAN MAC/PHY protocol and channel is identified for each WLAN that is detected, as depicted by start and end blocks 151 and 152, and the operations of block 154. Next, in a decision block 156, a determination is made to whether there are any non-overlapping channels available. More specifically, a non-overlapping channel here in this context is a channel defined by the MAC/PHY protocol used by each of the WLANs identified in block 154 that does not overlap with any of the 802.11 channels currently in use by the WLANs. The radio band of such non-overlapping channels also needs to define a frequency range that encompasses any frequencies or radio bands to be utilized by the wireless device during its operation. This is a relatively straightforward determination when the WLANs are implementing the same 802.11 protocols, or otherwise 802.11 protocols that use the same channels. However, when different 802.11 protocols are being used, this determination may be more complicated, since the channels defined for some of the 802.11 protocols differ, as shown above in FIGS. 3A-3C, for example.

If there is one or more non-overlapping channels available, the answer to decision block 156 will be YES, and the logic will proceed to a block 158 in which the wireless device and (optional) wireless device clients will be operated using an available non-overlapping channel. As illustrated, in some embodiments the wireless device may periodically check (e.g., via polling ED measurements) to detect any changes in the shared wireless medium environment, such as an addition or removal of a WLAN.

If there are no non-overlapping channels available, then the wireless device will utilize a channel being used by one of the WLANs sharing the wireless environment as a co-channel. In a block 160, the wireless device selects the co-channel to be used for its operations. Next in a decision block 161, a determination is made to whether there are any legacy stations (802.11a, 802.11b) operating in the WLAN using the co-channel. As discussed above, if a WLAN has any legacy stations, it will be implementing a CSMS/CA scheme using the RTS/CTS protocol. Since the RTS/CTS protocol adds overhead and reduces throughput, in one embodiment the selection of the co-channel in block 160 may take this into consideration when there are other co-channels that could be selected that do not require support for legacy stations.

If the WLAN that will be sharing the selected co-channel does not have any legacy stations, the logic proceeds to an optional decision block 162 in which a determination is made to whether RTS/CTS is to be selectively used (although not required). There may be situations where the location of the WLAN stations and the location of the wireless device transmitter and any wireless device clients are such that it may be advantageous to use RTS/CTS. In some embodiments, this determination may be made with the assistance of ED measurement made by one or more wireless device clients in addition to measurements made by the wireless device.

If no RTS/CTS is to be used, the logic proceeds to a block 164 in which the wireless device is operated as an emulated WLAN access point using the applicable 802.11 MAC and PHY protocols for access purposes to the co-channel shared with the WLAN. From the perspective of any 802.11 devices (APs and stations) operating within the shared wireless medium environment, the wireless device appears to be another WLAN AP that is implementing the same 802.11 version as used by the co-channel WLAN. However, the wireless device doesn't perform full WLAN AP functionality, but rather only is implementing aspects of a WLAN AP used to gain access to the co-channel.

These aspects include the following. In a block 166, the wireless device uses the applicable 802.11 CSMA/CA DCF protocol to select time slots to be used as wireless device second PHY time slots. As discussed above, the DCF protocol provides random access to the shared co-channel, under which time slots are (effectively) opportunistically selected for subsequent transmission. In a block 168, the wireless device then uses the time slots it has selected using the DCF protocol for wireless device operations using the second PHY (or a selected PHY among multiple available PHYs), which as discussed above, may involve one or more of transmitting signals, transmitting data to wireless device clients, and receiving data transmitted by wireless device clients. As further shown, the operations of blocks 166 and 168 are repeated on an ongoing basis.

Returning to decision blocks 161 and 162, if the answer to either of these is YES, the logic proceeds to a block 170 in which the wireless device is operated as an actual or emulated WLAN station within the WLAN sharing the co-channel, again using the applicable 802.11 MAC and PHY protocols for channel access purposes. Since the RTS/CTS protocol involves communication between a WLAN AP and station to reserve a time slot, it is necessary for the wireless device to operate as a WLAN station if RTS/CTS is to be used. Accordingly, in a block 172, the wireless device registers with the WLAN AP as a WLAN station using a real or pseudo MAC address and an applicable PHY. Generally, every 802.11 device (AP or station) will include a six-octet MAC address that is guaranteed to be unique by the manufacturer of the device or the manufacturer of the radio subsystem used by the device. The MAC address is used for routing traffic within the WLAN, as well as for managing access to the channel. For emulated 802.11 devices, the device may or may not have a "real" MAC address, depending on the implementation. However, from the viewpoint of the WLAN AP, it is agnostic to whether a MAC address is a real address or a pseudo address, as long as the MAC address is unique within the WLAN.

In a block 174 the wireless device uses the 802.11 CSMA/CA RTS/CTS protocol to reserve time slots to be used as wireless device second PHY time slots. The wireless device then uses the reserved time slots for wireless device operations using the second PHY (or a selected PHY among multiple available PHYs) in a block 176. The operations of blocks 174 and 176 are then repeated in an ongoing manner.

WLAN Topology Discovery

Figure 12:
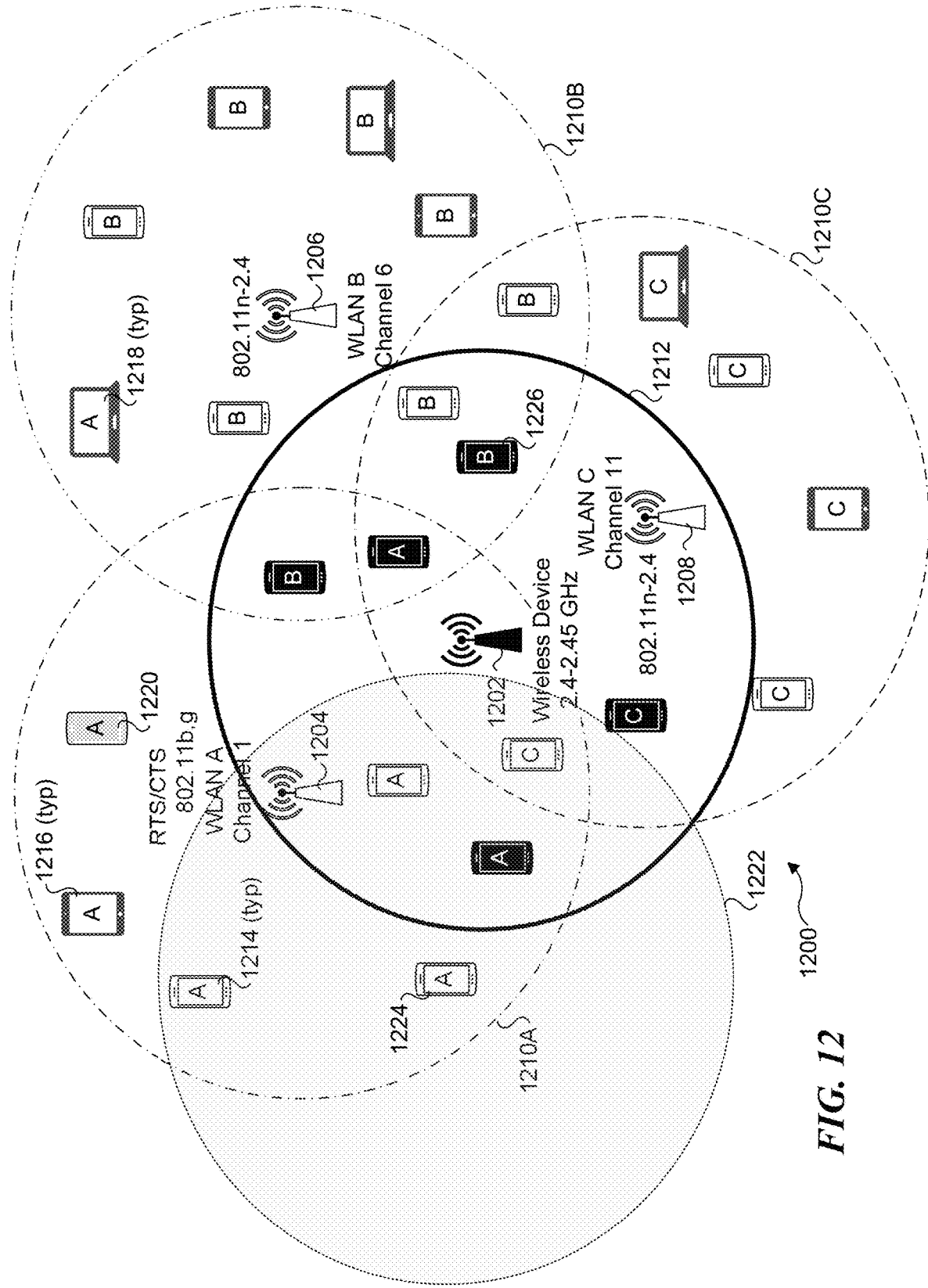
FIG. 12 is a diagram of an exemplary shared wireless medium environment including a wireless device and three WLANs with overlapping coverage areas.

In some instances, the WLAN topology of the shared wireless media environments in which a wireless device is implemented can be ascertained by the wireless device itself. FIG. 12 depicts a shared wireless media environment 1200 having such a WLAN topology. Shared wireless media environment includes a wireless device 1202 and three WLAN access points 1204, 1206, and 1208. Each of these WLAN access points is the access point for an associated WLAN, labeled WLAN A, B, and C. FIG. 12 shows a respective circle 1210A, 1210B, and 1210C representing the coverage areas of WLANs A, B, and C. The coverage area for a WLAN corresponds to the area in which the signal strength from the WLAN's access point is sufficient to meet the applicable 802.11 PHY requirements. For simplicity, the coverage areas are shown as circles; in reality, the shape of the coverage area for a given WLAN will vary, depending on the physical environment in which the WLAN is deployed.

FIG. 12 also shows a wireless device coverage area 1212, which again is shown as a circle for simplicity. As with WLANs, the coverage area for a wireless device will vary depending on the physical environment in which the wireless device is deployed. It is further noted that wireless device coverage area 1212 is depicted as having a nominal range from wireless device 1902. In practice, the wireless device coverage area may be adjusted by changing the power level of the signal transmitted from the wireless device.

As discussed above, the IEEE 802.11 WLAN protocols define a number of channels under which the WLAN may operate. When a new WLAN is added to a given environment, testing may reveal that there is interference on a given channel. Accordingly, the WLAN AP may be configured to operate on another channel. In the WLAN topology depicted in FIG. 12, the coverage areas 1210A, 1210B, and 1210C overlap, which may lead to interference issues if two or more of the WLANs were operating on the same channel. In this exemplary WLAN topology, WLAN A has been configured to operate on channel 1, while WLAN B utilizes channel 6 and WLAN C utilizes channel 11. In addition, each of WLANs B and C are labeled as 802.11n-2.4 networks, while WLAN A is being operated as an 802.11b,g network. As will be recognized by those skilled in the art, many 802.11n access points can service stations using other 802.11 versions, such as 802.11 b and g.

Each WLAN is further depicted as including multiple stations comprising mobile phones 1214, tablets 1216, and laptops 1218. The letters 'A', 'B', and 'C' on mobile phones 1214, tablets 1216, and laptops 1218 represent the WLAN each of these devices is associated with. Mobile phone 1220, which is depicted in gray, is a legacy device that can only support 802.11b signaling. Since a legacy device is being serviced by WLAN B access point 1206, WLAN A utilizes the 802.11 RTC/CTS protocol. Meanwhile, WLANs B and C utilize the 802.11 CSMA/CA DCF protocol.

The devices shown in black are wireless device clients. These client are configured to one or more of receive transmissions from the wireless device and transmit communications to the wireless device using one or more of an 802.11 protocol, ZigBee™, and Bluetooth™, or another wireless protocol. In this embodiment, wireless device 1902 is further configured to selectively transmit wireless signals in the frequency range of 2.4-2.45 GHz, including transmitting using a single frequency or radio band within the radio band of a given 802.11 channel.

For simplicity and point of illustration, it is presumed in this example that the WLAN access points and the wireless device cannot "hear" transmissions beyond their respective coverage areas. In practice, the 802.11 radio chips used by 802.11 APs and stations may be configured to ignore any signals transmitted from other wireless devices (stations and APs) having a detected single strength below a threshold (e.g., the ED thresholds discussed above). As further depicted by a reception/transmission area 1222 corresponding to a mobile phone 1224, each WLAN station will have its own reception and transmission area.

With this in mind, it is observed that wireless device 1902 can "see" access points 1204 and 1208 for WLANs A and C, but cannot see WLAN B access point 1206 (i.e., doesn't detect transmissions from AP 1206. Thus, wireless device 1902 cannot use AP 1906 to determine what channel WLAN B is using (channel 6 in this example). As a result, wireless device 1902 might choose to use channel 6, since channel 6 is known to not interfere with channels 1 and 11. However, this may result in interference issues for any devices within the coverage area 1212 of the wireless device that are WLAN B stations (depicted with 13'). In some embodiments, the channel determination for WLAN B may be obtained by listening to one or more WLAN B stations within coverage area 1212. However, there may be situations where the coverage area of the wireless device and the reception/transmission area of a WLAN station that is not also a wireless device client differ such that the wireless device cannot hear such a WLAN station.

One of the management frames defined for 802.11 WLANs is a beacon frame, which contains information about the WLAN, including an SSID, supported rates, Frequency-hopping (FH) Parameter Set, Direct-Sequence (DS) Parameter Set, Contention-Free (CF) Parameter Set, MSS Parameter Set, and a Traffic indication map (TIM). Beacon frames are periodically transmitted from the WLAN's AP, and may be listened to by devices within the coverage area of the AP. For WLAN APs a wireless device can hear, the WLAN beacon frames can be used to obtain information about the WLAN's operational parameters.

Under some embodiments, a wireless device client may be configured to assist with WLAN topology discovery. For example, mobile phone 1226 is both a WLAN B station and a wireless device client, and can communicate with both wireless device 1902 and WLAN B AP 1906. Mobile wireless device client logic in mobile phone 1226 may be configured to access WLAN topology information from WLAN B AP 1206, thereby enabling wireless device 1902 to be apprised of WLAN B stations that it otherwise cannot detect for which wireless device transmission may cause interference.

Under some embodiments, the Control and Provisioning of Wireless Access Points (CAPWAP) Protocol Specification defined by RFC 5415 may be used by the wireless device to communicate with the WLAN AP when the wireless device is operating as an actual or emulated WLAN AP. Alternatively, the wireless device may communicate with an Access Controller (AC) that is used to manage a collection of Wireless Termination Points (WTPs), which is what some WLAN APs are referred in the specification.

Under some shared wireless medium environment topologies, the coverage area of a wireless device and a particular WLAN may overlap, but there may not be any WLAN stations for that particular WLAN within that coverage area. Additionally, under some embodiments, a wireless device and a WLAN AP may be co-located (as separate systems), or a wireless device may be configured to support full WLAN AP functionality, including routing functionality and connection to a wired network. In these cases, a wireless device that is within the coverage area of the wireless device/AP or co-located AP and within the coverage area of another WLAN may select to not join the other WLAN.

As a result, coexisting operations of the wireless device and the other WLAN may be supported using the same channel (or one or more frequencies within the channel) under which the channel is not shared. Since there are not stations for the other WLAN within the coverage area of the wireless device, transmission of signals on the channel (or within the channel) will not interfere with any of the other WLAN's stations.

Returning to FIG. 12, each of WLANs A, B, and C include WLAN stations within wireless device coverage area 1212. Since the wireless device (in this example) can only transmit wireless signals using frequencies up to 2.45 GHz, the wireless device cannot use channel 14. Thus, the wireless device will select one of WLANs A, B, or C to operate as a co-channel network with. This decision (which WLAN to choose) may be based on various considerations, such as how many wireless device clients are being operated as stations in a particular WLAN, how many stations are operating within each WLAN, and operational parameters of the WLANs. In some embodiments it may be preferable to select a WLAN that does not need to support legacy devices (and thus using RTS/CTS). In some embodiments, it may be preferable to select a WLAN with the least (current) utilization, since the fair sharing schemes would result in more of the channel time slots being used as wireless device second PHY timeslots. To facilitate the determination of how many stations are present in each WLAN, under some environments WLAN APs may be configured to communicate with one another using a distributed management protocol under which the WLANs exchange topography information.

Opportunistic RTS/CTS Operation

The wireless device may be configured to implement an opportunistic RTS/CTS operation to utilize more of the channel (when viewed from a time basis) than conventional RTS/CTS operation, while still operating in a manner that coexists with the WLAN. As discussed above, under RTS/CTS a station requesting access to the channel sends an RTS frame. This is followed by a CTS frame that is returned to the station that sent the RTS frame. The CTS frame has a MAC header that includes a 2 octet duration value in microseconds.

The wireless device can take advantage of the following scenario. Under some embodiments the wireless device can use ED to detect the signal strength of the station sending the RTS frame. If that signal strength falls below a threshold, such as the ED threshold defined for the 802.11 version being used in the WLAN, then the wireless device may transmit power signals during the same period defined by the duration in the CTS returned to the requesting station (the time slot reserved by the requesting station)—that is the station receiving the CTS and the wireless device may transmit at the same time during the reserved time slot since the transmitted power signals from the wireless device will not interfere with the requesting stations transmissions. Alternatively, if the wireless device cannot "hear" a CTS (e.g., under a standard PHY configuration for the applicable 802.11 version), but can "hear" a RTS, the wireless device can transmit power signals during the time slot reserved by the requesting station. Under this latter approach, a separate ED threshold detection is not needed, as the PHY will be configured to ignore any communications that fall below a predefined sensitivity level.

A situation under which the wireless device will not be able to detect RTS frames, but will be able to detect CTS frames is illustrated in FIG. 12. For example, wireless device 1202 will not be able to detect CTS frames transmitted from any of the WLAN stations in WLAN A that are outside of wireless device coverage area 1212, but will be able to detect all of the CTS frames since WLAN A AP 1904 is within wireless device coverage area 1212.

In some embodiments, a wireless device may utilize multiple co-channels, or use a combination co-channel and opportunistic RTS/CTS scheme. For example, under shared wireless medium environment 1200, wireless device 1202 may utilize either channel 6 or channel 11 for co-channel operation with WLAN B or WLAN C, while listening to the RTS and CTS frames transmitted in WLAN A, and using channel 1 for time slots that are detected as being reserved by WLAN A stations that are outside of wireless device coverage area 1212.

Sharing Access to Wireless Medium Using Devices with Multiple PHYs

As disclosed herein, techniques are provided for devices with multiple PHYs to access shared wireless medium environments under which a first PHY and associated MAC is used to select or reserve time slots, while a second PHY is used to transmit and/or receive signals during those time slots. An exemplary embodiment illustrating such a device and how it is implemented is shown in diagram 1300 of FIG. 13.

A multi-PHY host device 1302 includes a single or multiple-mode PHY 1304 (also labeled and referred to as PHY 1) and a separate PHY 1306 (also referred to and labeled as PHY 2). A MAC 1308 is depicted above PHY 1 and the dashed outline 1310 indicates that PHY 1 and MAC 1308 may be implemented on the same chip, such as the same radio sub-system chip. Meanwhile, a MAC 1312 depicted above PHY 2 is shown as a dashed block to indicate it is optional. For simplicity other aspects of the PHY and multi-PHY host device 1302 are not shown such as transmit and receive amplifiers and antennae.

The left-hand side of diagram 1300 depicts operations performed by PHY 1 and MAC 1308. These operations begin at a start block 1314. In a block 1316, the presence of one or more WLANs operating in the shared wireless medium are detected. This can generally be performed using the techniques described above with reference to FIGS. 8A and 8B. Under the illustrated scheme, PHY 1 is a single or multi-mode PHY, meaning it may be configured to implement a single PHY or multiple PHYs. For example, in the context of IEEE 802.11, a single PHY might be any of 802.11a, 802.11b, 802.11g, 802.11n, and 802.11 ac. In the case of a multi-mode PHY, the PHY supports multiple different PHYs (referred to as PHY modes) under which the signaling used by the different PHYs is different. For example, 802.11b uses DSSS, while 802.11a and 802.11g uses OFDM and 802.11n and 802-11ac use MIMO-OFDM.

In the case of a multi-mode PHY, PHY 1 will scan the available channels for one or more of its PHY modes to detect the presence of a WLAN utilizing that channel and a PHY corresponding to the PHY mode. This is depicted by start and end loop blocks 1318 and 1322, and a decision block 1320. When a PHY and channel is detected to be in use in decision block 1320, that PHY and channel is added to a list of WLANs operating in the shared wireless medium environment.

Figure 13:
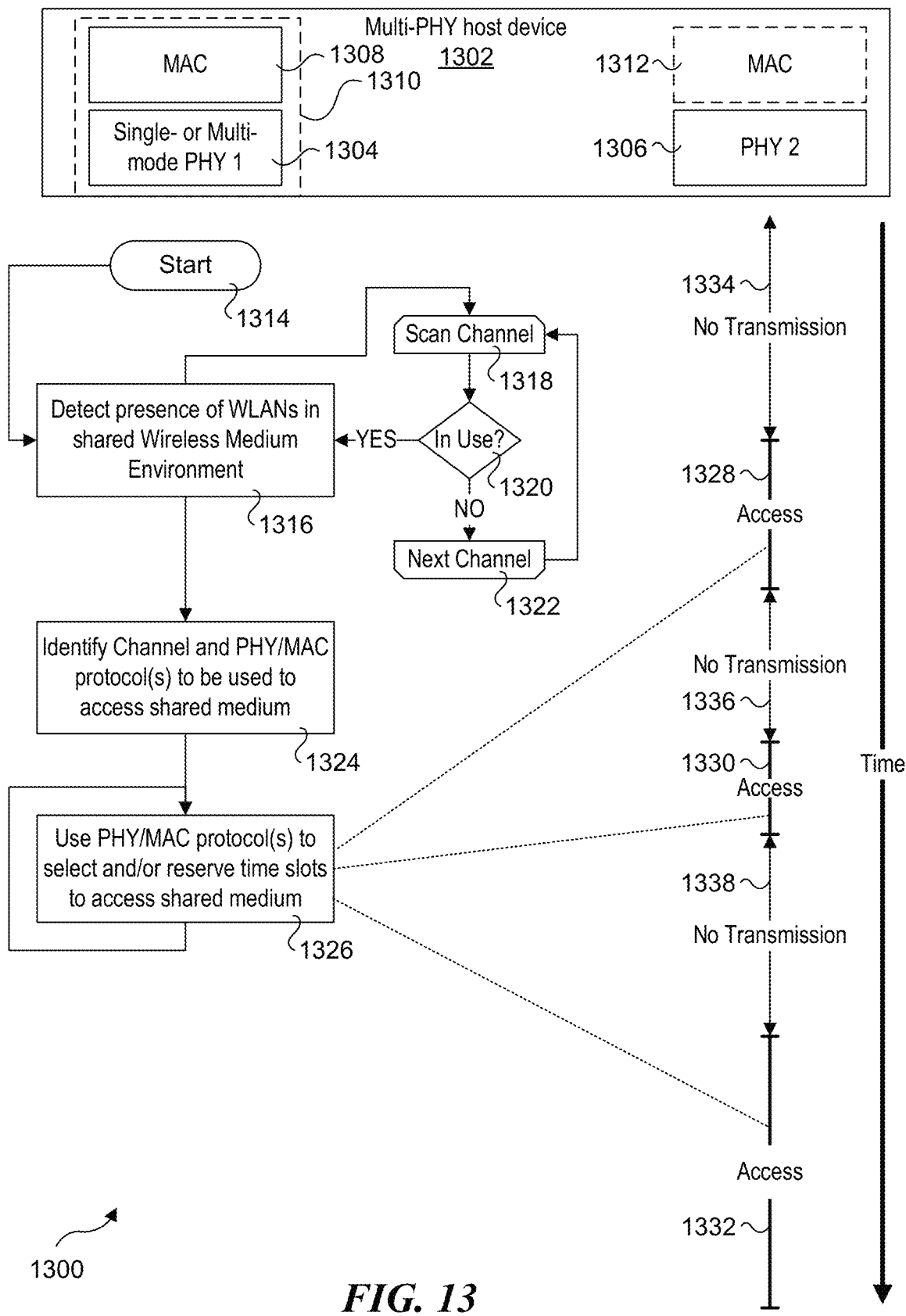
FIG. 13 is a diagram illustrating operations of a multi-PHY host device to select and/or reserve time slots for accessing a shared wireless medium using a first PHY, and to access the shared wireless medium during those time slots using a second PHY.

Upon completion of block 1316, the logic proceeds to a block 1324 in which a channel and PHY/MAC protocol(s) to be used to access the shared wireless medium are identified. For example, suppose channel 1 of an IEEE 802.11g WLAN is to be used. The PHY and MAC protocols will be the corresponding PHY and MAC protocols defined by the IEEE 802.11g WLAN specification. It is noted that the embodiment of FIG. 13 is not limited to IEEE 802.11 WLANs, but rather may be implemented in a shared wireless medium environment in which one or more WLANs using any existing or future WLAN standard are operating. In some embodiments, the PHY/MAC is considered to be a single protocol that covers both the operation of the PHY Layer and the MAC Layer.

In a block 1326 the PHY/MAC protocol(s) are used to select and/or reserve time slots to access the shared wireless medium. For IEEE 802.11 WLANs, this can be done in the manner discussed above, e.g., using CSMA-CA with a CFD algorithm to select time slots or using an RTS/CTS scheme to reserve time slots. For other types of existing and future WLANs, appropriate techniques for selecting and/or reserving time slots (as applicable) may be used. As shown by the loop back to itself, the operations of block 1326 are performed on an ongoing basis.

Figure 14:
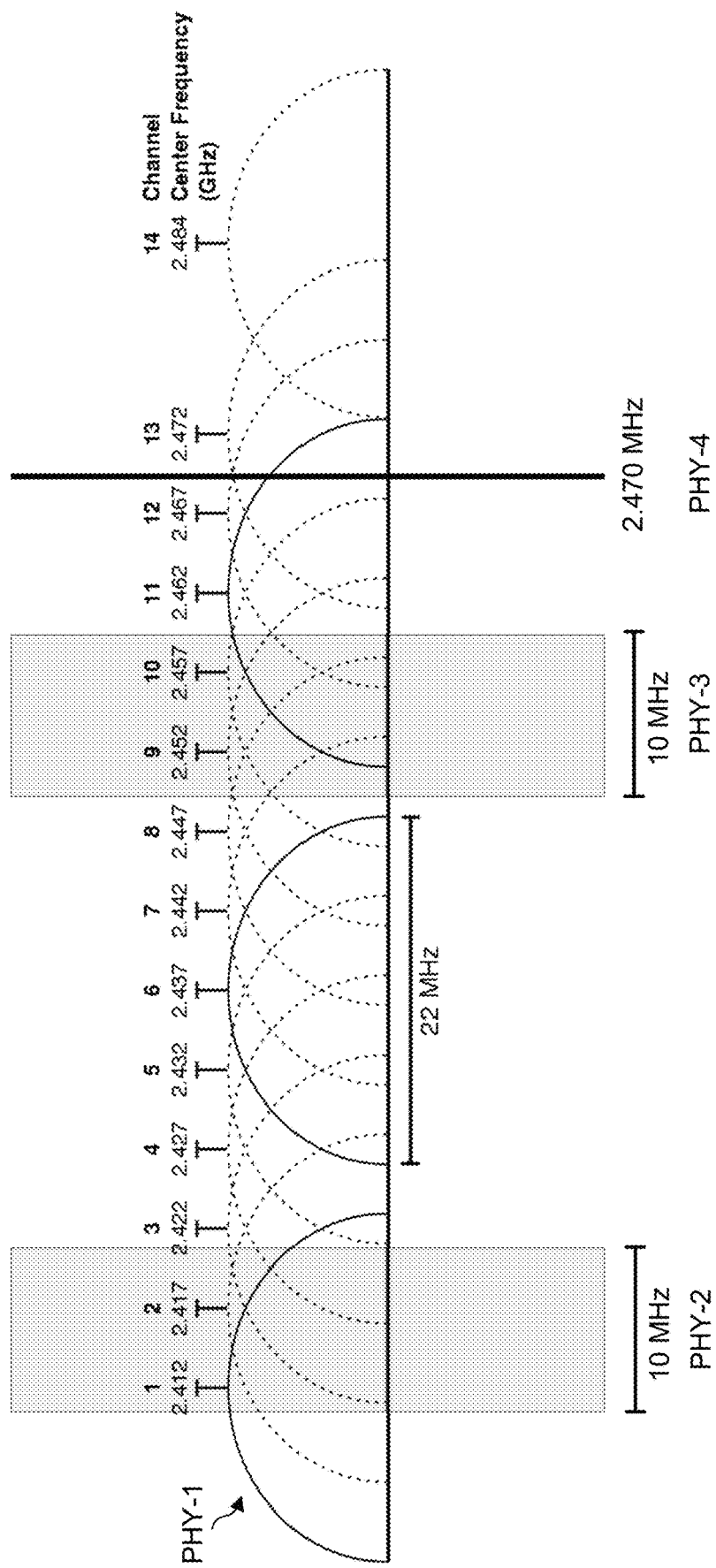
FIG. 14 is a diagram illustrating three examples of overlapping conditions.

The right-hand side of diagram 1300 depicts utilization of PHY 2 to access the shared wireless medium. PHY 2 is going to be using a different PHY than PHY 1. For example, in some embodiments, PHY 1 will be an IEEE 802.11 PHY, while PHY 2 will be a non-IEEE 802.11 PHY. In some embodiments, the frequency or radio band used by PHY 2 will overlap the radio band of the channel used by PHY 1, as illustrates in FIG. 14 below.

As illustrated, PHY 2 will access the shared wireless medium at time slots 1328, 1330, and 1332, which were selected and/or reserved using PHY 1 and an associated MAC in block 1326. During time periods 1334, 1336, and 1338 PHY 2 will not transmit signals, although in some embodiments it may receive signals transmitted by other devices (not shown) using PHY 2. During the access time slots 1328, 1330, and 1332, PHY 2 may be used to transmit and/or receive signals. As discussed above, in some embodiments, PHY 2 may employ MAC 1312 during these time slots. Optionally, under other embodiments a MAC is not used.

FIG. 13 illustrated three examples of "overlapping" as used herein, including the claims. PHY-1 uses the same channel diagram as illustrated in FIG. 2A, which illustrates the channel spacing of an 802.11b and 802.11g WLAN operating at 2.4 GHz. PHY-2 is depicted that has a radio band having a width of 10 MHz that is entirely contained within the 22 MHz radio band of channel 1. PHY-3 is depicted to have a 10 MHz radio band that partially overlaps channel 11. PHY-4 uses a single 2.470 MHz frequency that is within the radio band of channel 11. Similar overlapping may be implemented for other WLANs. It is further noted that the 10 MHz radio band width is exemplary, as a given PHY may implement radio bands having different bandwidths.

Exemplary Multi-PHY Wireless Devices

Figure 15:
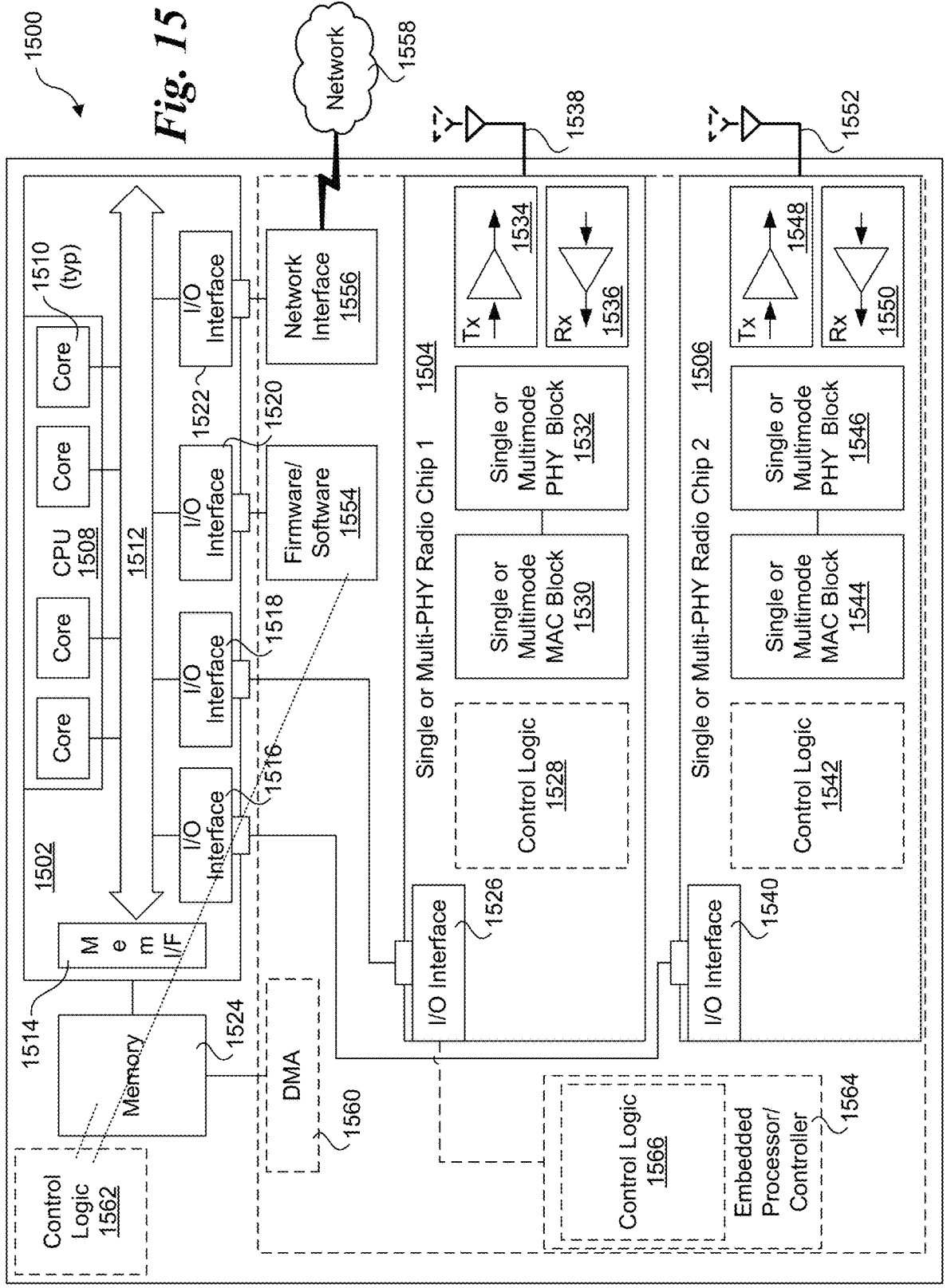
FIG. 15 is a block diagram illustrating example components of a representative wireless device configured to implement aspects of the functionality disclosed herein, in accordance with some embodiments.

FIGS. 15 and 15A depict block diagrams illustrating example components of representative multi-PHY wireless devices 1500 and 1500A, according to respective embodiments. Various components, functional blocks and interfaces are shown with reference to FIGS. 15 and 15A, however, the wireless device does not require all of the components, functional blocks, and interfaces for performing the functionality described herein. It is appreciated that, in many embodiments, various components are not included and/or necessary for operation of the wireless device. In addition, the wireless device can include additional components that are not shown for brevity.

As shown in FIG. 15, multi-PHY wireless device 1500 includes a processor 1502 that is coupled to a pair of single or multi-PHY radio chips 1504 and 1506. As further shown, processor 1502 includes a CPU (central processor unit) 1508 including one or more cores 1510 coupled to an interconnect 1512. Interconnect 1512, which is representative of one or more levels of interconnects (e.g., in an interconnect hierarchy) is further connected to a memory interface 1514 and Input/Output (I/O) interfaces 1516, 1518, 1520, and 1522. Memory interface 1514 enables the processor to access memory 1524, which generally may be a form of volatile memory, such as Dynamic Random Access Memory (DRAM), or a non-volatile memory, such as, but not limited to flash memory. Memory 1524 may further be implemented as a combination of volatile and non-volatile memory, such as Intel® 3D Xpoint™ memory.

Single or multi-PHY radio chip 1504 includes an I/O interface 1516, a control logic block 1528, a single or multimode MAC block 1530, a single or multimode PHY block 1532, transmitter circuitry 1534, and receiver circuitry 1536. Single or multi-PHY radio chip 1504 is further coupled to an antenna 1538, collectively forming a first radio subsystem. Antenna 1538 is representative of a single or multiple antennas, such as implemented in a MIMO (multiple input, multiple output) radio interface.

Similarly, single or multi-PHY radio chip 1506 includes an I/O interface 1540, a control logic block 1542, a single or multimode MAC block 1544, a single or multimode PHY block 1546, transmitter circuitry 1548, and receiver circuitry 1550. Single or multi-PHY radio chip 1506 is further coupled to an antenna 1552, collectively forming a second radio subsystem. As before, antenna 1552 is representative of a single or multiple antennas A storage device 1554 representing one or more storage devices on which firmware or software is stored, is coupled to processor 1502 via I/O interface 1520. For example, exemplary stored devices including flash memory, solid state drives (SSDs), magnetic media drives, or various other types of storage devices suitable for storing firmware and/or software.

A network interface 1556 is connected to processor 1502 via I/O interface 1522, enabling the wireless device 1500 to access a wired network 1558 using a wire connection. For example, network interface may be an Ethernet interface or Ethernet Network Interface Controller (NIC), an InfiniBand Host Controller Adaptor (HCA), or a network interface in accordance with various other types of wired network standards.

Wireless device 1500 further is depicted as including an optional direct memory access (DMA) block 1560. DMA block 1560 is representative of DMA functionality that may be provided by wireless device 1500; as will be understood by one skilled in the processor art, DMA functionality is actually implemented via multiple components rather than a single logic or functional block. For example, in one embodiment, at least a portion of the I/O interfaces are PCIe (Peripheral Component Interconnect Express) interfaces, which, along with other circuitry not shown, including a PCIe root complex that would be coupled to interconnect 1512, enable data to be transferred between a component external to processor 1502 (such as one or both single or multi-PHY radio chips 1504 and 1506) and memory 1524 without use of CPU 1508.

Various functionality for the wireless devices described herein may be implemented using "control logic," which is collectively used to refer to logic that may be used to implement corresponding control and communication operations. The control logic may be implemented in one or more components, or in a distributed manner under which portions of the control logic are implemented in different components. For this reason, the various blocks depicting "control logic" are shown in dashed outline, indicating they are optional.

One mechanisms for implementing all or a portion of the control logic is via execution of corresponding firmware or software that is stored in storage device 1554, loaded into memory 1524, and executed on one or more or processor cores 1510, as depicted by control logic 1562. Optionally, all or a portion of the control logic for controlling the PHY and MAC of a given radio subsystem may be implemented on the associated radio chip, such as depicted by control logic 1528 and 1542. As yet another option, separate embedded logic may be used, as depicted by an embedded processor or controller 1564 and control logic 1566. More generally, the embedded logic may be implemented using one of several well-known approaches, such as executing firmware/software on an embedded processor or controller, using an Application Specific Integrated Circuit (ASIC) or a Field Programmable Gate Array (FPGA) or the like. Likewise, control logic 1528 and 1542 may be implemented in a similar manner.

Under the configuration illustrated for wireless device 1500A in FIG. 15A, a single multi-PHY radio chip 1568 is used in place of two single or multi-PHY radio chips. As further shown, multi-PHY radio chip includes an I/O interface 1570, control logic 1572, a first single or multimode MAC block 1530A (referred to as MAC 1), a first single or multimode PHY block 1532A (referred to as PHY 1), a second single or multimode MAC block 1544A (referred to as MAC 2), a second single or multimode PHY block 1546A (referred to as PHY 2), transmitter circuitry 1534 and 1548, and receiver circuitry 1536 and 1548.

In addition to the configuration illustrated in FIGS. 15 and 15A, the various functional blocks, interfaces, and circuit may be integrated using different configurations, such as a System on a Chip (SoC) architecture, or in a multi-chip package. For example, under one embodiment of an SoC implementation, all of the components may be implemented on a single chip or module. Optionally, one or both of memory 1524 and storage device 1554 may be implemented on separate chips, with the remainder of the components implemented on an SoC.

Figure 16A:
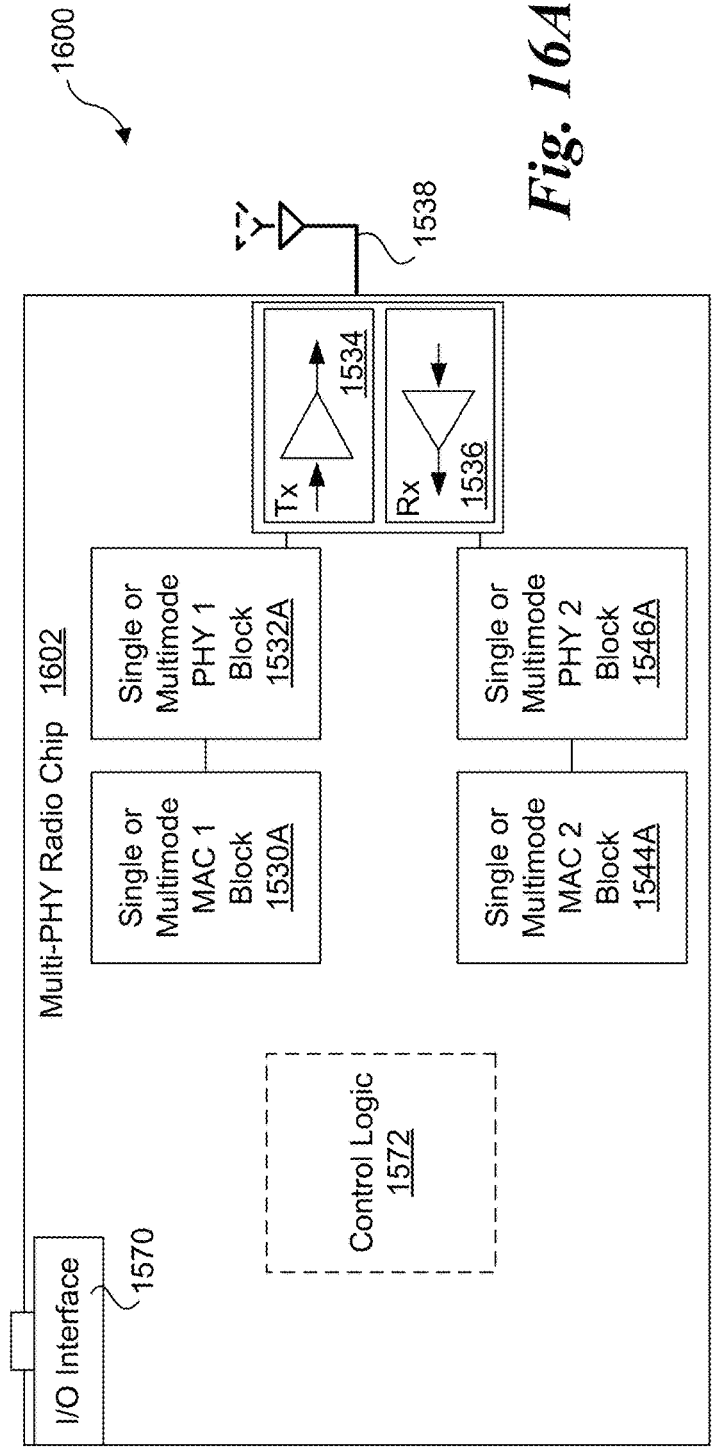
FIG. 16A shows a variation of the radio subsystem of FIG. 15A under which transmitter and receiver circuitry is shared between MAC/PHY blocks on a time-based manner, according to one embodiment.
Figure 16B:
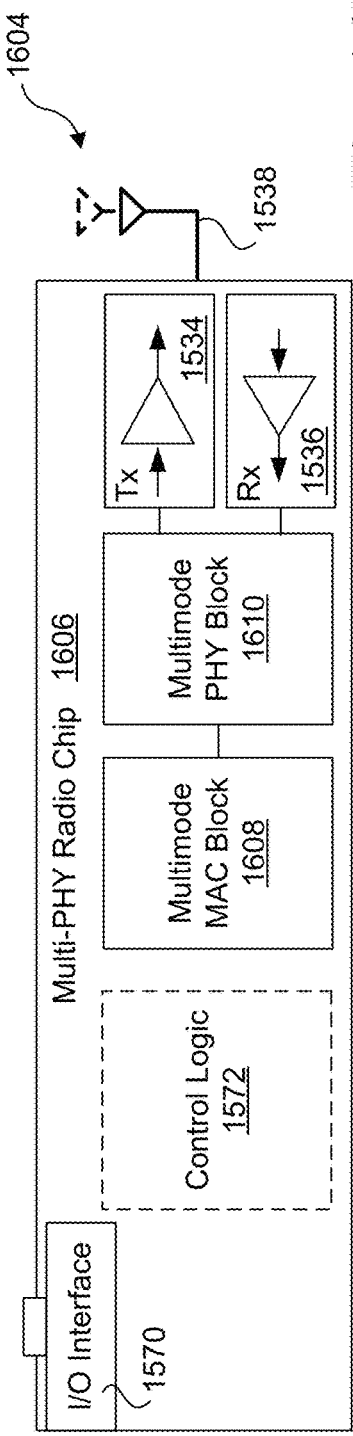
FIG. 16B shows another configuration of a radio subsystem of FIG. 15A using multimode MAC and PHY blocks coupled to transmitter and receiver circuitry that is shared on a time-based manner, according to one embodiment.

Additional alternative configurations of Multi-PHY radio chips and associated radio subsystems are shown in FIGS. 16A and 16B. Radio subsystem 1600 of FIG. 16A includes a multi-PHY radio chip 1602 that is similar to multi-PHY radio chip 1568 of FIG. 15A, except rather than having separate transmitter and receiver circuitry for each MAC/PHY block, the transmitter and receiver circuitry is shared across PHYs/MAC on a time-based manner. For example, a first set of PHY/MAC blocks may be used to select and/or schedule timeslots during which a second set of PHY/MAC blocks are used to transmit and/or receive wireless signals.

FIG. 16B shows a radio subsystem 1604 including a multi-PHY radio chip 1606 that represents a modification of this concept. This configuration includes a multimode MAC block 1608 and a multimode PHY block 1610 coupled to transmitter circuitry 1534 and receiver circuitry 1536. Radio subsystem 1604 operates in a similar manner, except under radio subsystem 1604, the multimode MAC and PHY block and the transmitter and receiver circuitry are shared on a time-based manner.

Generally, the single or multi-PHY radio chips depicted herein may be implemented with existing single and multiple-PHY radio chips, or may comprise custom radio chips. For example, multi-PHY radio chips are available from various manufactures, such as Broadcom, Cypress Semiconductor, Qualcomm, Tex. Instruments etc. Single chip MAC/PHY/Radio System on a Chip (SoC) components may also be used. Such SoC chips may also provide additional functionality, such as integrated Bluetooth™, and include integrated transmitter amplifiers and receiver circuitry. A customized chip may also be used, such as an MAC/PHY/Radio SoC that includes integrated ZigBee™.

In some embodiments a Texas Instruments TI CC2650 SimpleLink multi-standard 2.4 GHz ultra-low power wireless MCU (microcontroller unit) or similar multi-PHY radio SoC maybe be used. The TI CC2650 includes an Arm® Cortex®—M3 main CPU, an RF core including an Arm® Cortex®—M0 CPU coupled to RF transmitter and receiver circuitry, multiple memory and storage blocks, and various other functional blocks and interfaces.

Processor 1502 may be, for example, a conventional microprocessor such as an Intel® or AMD® microprocessor or an ARM®-based microprocessor. Those skilled in the computer arts will recognize that the terms "machine-readable (storage) medium" or "computer-readable (storage) medium" generally include any type of device that can store instructions and or data that may be accessed by a processor (using an appropriate interface or interfaces).

Software-Defined Radio

In addition to using various radio chip configurations, one or more software-defined radio (SDR) components or modules may be used to implement a multimode PHY. A software-defined radio is a radio implemented with reconfigurable software, which processes the raw samples of a digitized radio signal. This differs from conventional hardware radios, which employ RF circuits and digital signal processors to implement this processing in a way that is hardwired and hardcoded to their application, observing that multimode radio chips may be used for different protocols and/or applications.

Figure 17:
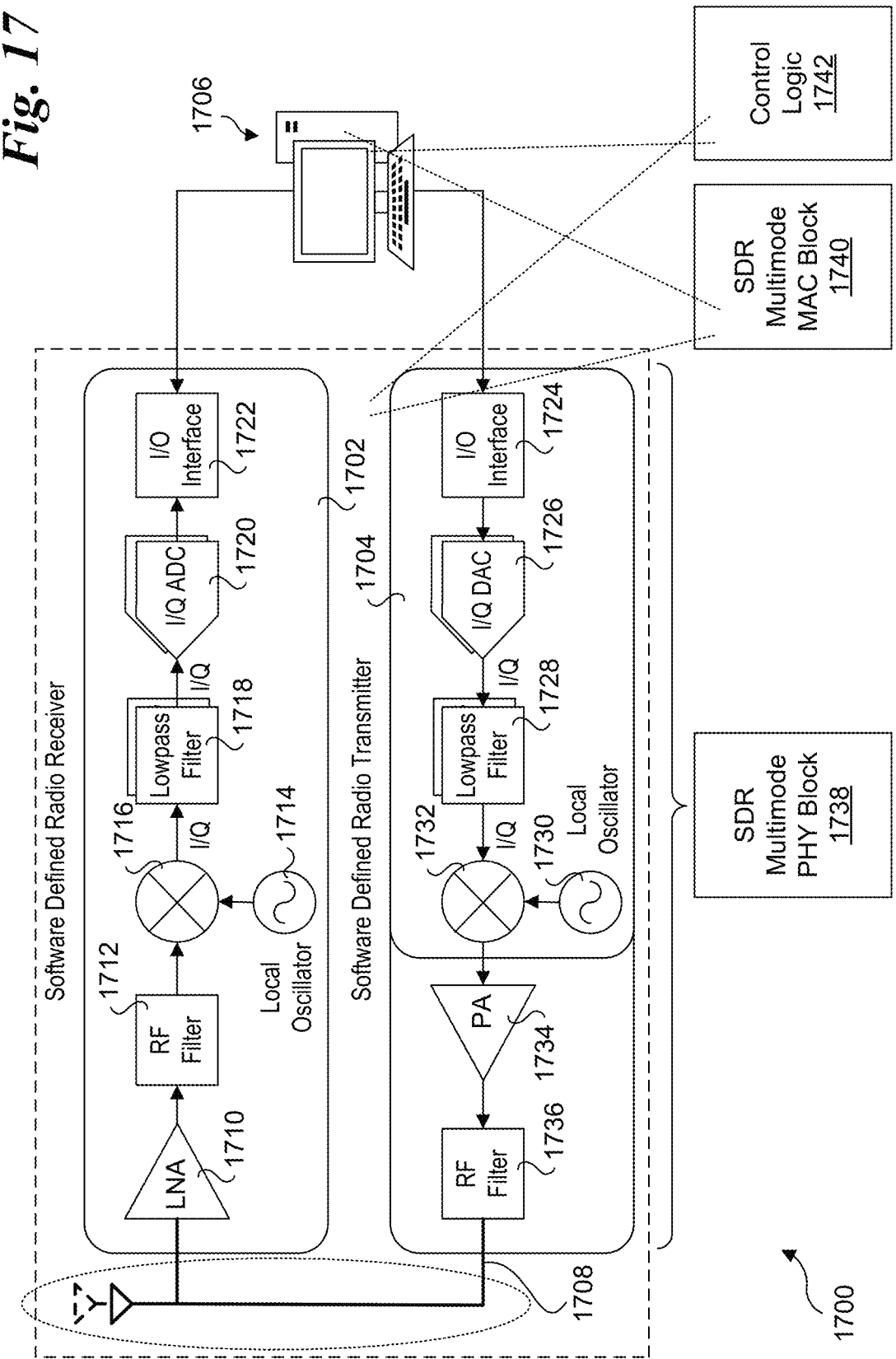
FIG. 17 is a diagram illustrating a software-defined radio (SDR) system, according to one embodiment.

At a high level, an SDR system consists of an antenna(s), a transmitter, a receiver, and a host computer (or optionally, a host processor). A simplified representation of an SDR system 1700 is shown in FIG. 17. SDR system 1700 includes an SDR receiver 1702, an SDR transmitter 1704, a host computer 1706, and antenna(s) 1708. SDR receiver 1702 includes a low-noise amplifier (LNA) 1710, an RF filter 1712, a local oscillator 1714, a mixer 1716, one or more lowpass filters 1718, one or more I/Q analog-to-digital converters (ADC) 1720, and an I/O interface 1722. SDR transmitter 1704 includes an I/O interface 1724, one or more I/Q digital-to-analog converters (DAC) 1726, one or more lowpass filters 1728, a local oscillator 1730, a mixer 1732, a power amplifier (PA) 1734, and an RF filter 1736.

FIG. 17 also depicts an SDR multimode PHY block 1738, an SDR multimode MAC block 1740, and control logic 1742. Generally, the SDR receiver and transmitter can be configured via software to operate as a multimode PHY. Meanwhile, a multimode MAC block may be implemented either via software executing on host computer 1706, embedded logic in the SDR transmitter and receiver (not separately shown), or the combination of the two. Control logic 1742 will generally be implemented via execution of software on host computer 1706, but some of the logic for performing the control logic operations may also be implemented in the SDR hardware.

Generally, one or more SDR systems may be substituted for one or more of the radio chips shown in FIGS. 15 and 15A. For example, a system might consist of a single SDR system, a pair of SDR systems (sharing a single host computer or processor), or a combination of a SDR system and a radio chip-based system, each implementing respective MAC and PHY blocks.

In addition to systems implementing two PHYs (and associated MACs, as applicable), this concept can be extended to support three or more PHYs. For instance, there may be some situations where it may be advantageous to use a first MAC/PHY to select and/or reserve timeslots, and transmit and/or receive wireless signals using two or more separate PHYs during the timeslots. For example, let's say you would like to have a system co-exist with a WLAN using a wide channel, such as a 40 or 80 MHz channel available for IEEE 802.11n. 40 or 80 MHz is adequate bandwidth to support multiple separate overlapping channels and/or frequencies for wireless signals.

Firmware and/or software is typically stored in the non-volatile memory and/or the drive unit and loaded into volatile memory (e.g., RAM) prior to execution. Indeed, for large programs, it may not be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In general, the circuitry, logic and components depicted in the figures herein may also be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to ASICs, FPGAs, IP block libraries, or through one or more of software or firmware instructions executed on one or more processing elements including processors, processor cores, controllers, microcontrollers, microengines, etc.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed by a wireless device configured to transmit and receive wireless signals using each of a first Physical Layer (PHY) and a second PHY in a shared wireless medium environment including one or more wireless local area networks (WLANs), comprising:

using the first PHY and a first Media Access Channel (MAC) to
      select time slots to access the shared wireless medium; and using the second PHY to at least one of transmit wireless
signals and receive wireless signals during the selected
time slots,
wherein the selection of time slots does not involve
outbound communication with another wireless device
using the shared wireless medium.

2. The method of claim 1, wherein the first PHY utilizes a channel having a first radio band, and wherein the second PHY utilizes at least one of:
one or more frequencies including a frequency that is within the first radio band; and
a channel having a second radio band that overlaps at least a portion of the first radio band.

3. The method of claim 1, wherein each of the one or more WLANs utilizes at least one PHY protocol and at least one MAC protocol, and wherein the method further comprises:
detecting a first MAC protocol utilized by a first WLAN utilizing the first PHY; and
using the first PHY and the first MAC protocol to select time slots during which the second PHY is used to at least one of transmit signals and receive signals.

4. The method of claim 3, wherein the one or more WLANs are Institute of Electrical and Electronics Engineers (IEEE) 802.11 WLANs, each utilizing at least one IEEE 802.11 PHY protocol and at least one IEEE 802.11 Media Access Channel (MAC) protocol, and wherein the first PHY is a first IEEE 802.11 PHY, the method further comprising:
detecting a first IEEE 802.11 MAC protocol utilized by a first IEEE 802.11 WLAN utilizing the first PHY; and
using the first IEEE 802.11 PHY and the first IEEE 802.11 MAC protocol to select time slots during which the second PHY is used to at least one of transmit signals and receive signals.

5. The method of claim 4, wherein the first IEEE 802.11 MAC protocol supports a carrier-sense multiple access with collision avoidance (CSMA/CA) scheme employing a distributed coordination function, further comprising using the first IEEE 802.11 PHY and the first IEEE 802.11 MAC protocol to select time slots using the CSMA/CA scheme and distributed coordination function.

6. The method of claim 1, wherein the one or more WLANs are Institute of Electrical and Electronics Engineers (IEEE) 802.11 WLANs, further comprising:
detecting, for each of at least one of the one or more IEEE 802.11 WLANs,
a channel being utilized by the WLAN; and
one or more IEEE 802.11 Media Access Channel (MAC) and Physical Layer (PHY) protocols utilized by the WLAN; and
identifying a channel to be implemented as a co-channel by the wireless device and an IEEE 802.11 MAC and PHY protocol to be implemented by the wireless device using the first PHY.

7. The method of claim 1, wherein neither the first PHY nor second PHY comprises an Institute of Electrical and Electronics Engineers (IEEE) 802.15 PHY.

8. The method of claim 1, wherein the wireless devices is a first wireless device in a shared wireless medium environment includes a plurality of Electrical and Electronics Engineers (IEEE) 802.11 WLANs including a first IEEE 802.11 WLAN that has a broadcast range that does not reach the first wireless device, further comprising:
receiving, from a second wireless device located within the broadcast range of the first IEEE 802.11 WLAN, information concerning operational parameters utilized by the first IEEE 802.11 WLAN; and
utilizing the information concerning the operational parameters to transmit signals using the second PHY in a manner that does not interfere with wireless devices within the broadcast range of the first IEEE 802.11 WLAN that the first wireless device cannot see.

9. The method of claim 1, wherein the wireless device comprises a first wireless device and wherein the shared wireless medium includes second wireless device communicating over a first channel with a first Electrical and Electronics Engineers (IEEE) 802.11 WLAN access point (AP) utilizing a first IEEE 802.11 protocol, further comprising:
detecting, at the first wireless device, a received signal strength of a signal corresponding to a request to send (RTS) frame transmitted from the second wireless device falls below a signal strength threshold defined by the first IEEE 802.11 protocol;
detecting a clear to send (CTS) frame transmitted by the first IEEE 802.11 WLAN AP in response to the RTS, the CTS frame including a time duration value defining a time period following the CTS frame during which the second wireless device is cleared to transmit signals; and
using the second PHY to at least one of transmit wireless signals and receive wireless signals using the first channel during the time period.

10. A wireless device, configured to transmit and receive wireless signals using each of a first Physical Layer (PHY) and Media Access Layer (MAC) and a second PHY and second MAC and to be operated in a shared wireless medium including one or more wireless local area networks (WLANs), further configured to:
use the first PHY and the first MAC to
select time slots to access the shared wireless medium; and
use the second PHY to at least one of transmit wireless signals and receive wireless signals during the selected time slots,
wherein the selection of time slots does not involve outbound communication with another wireless device using the shared wireless medium.

11. The wireless device of claim 10, wherein the first PHY utilizes a channel having a first radio band, and wherein the second PHY utilizes at least one of:
one or more frequencies including a frequency that is within the first radio band; and
a channel having a second radio band that overlaps at least a portion of the first radio band.

12. The wireless device of claim 10, wherein each of the one or more WLANs utilizes at least one PHY and at least one MAC protocol, and wherein the wireless device is further configured to:
detect a first MAC protocol utilized by a first WLAN utilizing the first PHY; and
use the first PHY and the first MAC protocol to select time slots during which the second PHY is used to at least one of transmit signals and receive signals.

13. The wireless device of claim 12, wherein the one or more WLANs are Institute of Electrical and Electronics Engineers (IEEE) 802.11 WLANs, each utilizing at least one IEEE 802.11 PHY protocol and at least one IEEE 802.11 MAC protocol, wherein the first PHY is a first IEEE 802.11 PHY, and wherein the wireless device is further configured to:
detect a first IEEE 802.11 MAC protocol utilized by a first IEEE 802.11 WLAN utilizing the first PHY; and use the first IEEE 802.11 PHY and the first IEEE 802.11 MAC protocol to select time slots during which the second PHY is used to at least one of transmit signals and receive signals.

14. The wireless device of claim 13, wherein the first IEEE 802.11 MAC protocol supports a carrier-sense multiple access with collision avoidance (CSMA/CA) scheme employing a distributed coordination function, and wherein one of the control logic and the first radio subsystem is configured to use the first IEEE 802.11 PHY and the first IEEE 802.11 MAC protocol to select time slots using the CSMA/CA scheme and distributed coordination function.

15. The wireless device of claim 9, wherein the one or more WLANs are Institute of Electrical and Electronics Engineers (IEEE) 802.11 WLANs, and the wireless device is further configured to:
    detect, for each of at least one of the one or more IEEE 802.11 WLANs,
        a channel being utilized by the WLAN; and
        one or more IEEE 802.11 Media Access Channel (MAC) and Physical Layer (PHY) protocols utilized by the WLAN; and
    identify a channel to be implemented as a co-channel by the wireless device and an IEEE 802.11 MAC and PHY protocol to be implemented by the wireless device using the first PHY.

16. The wireless device of claim 10, wherein neither the first PHY nor second PHY comprises an Institute of Electrical and Electronics Engineers (IEEE) 802.15 PHY.

17. The wireless device of claim 10, wherein the shared wireless medium environment includes a plurality of Electrical and Electronics Engineers (IEEE) 802.11 WLANs including a first IEEE 802.11 WLAN that has a broadcast range that does not reach the wireless device, wherein the wireless device is further configured to:
    receive, from a second wireless device located within the broadcast range of the first IEEE 802.11 WLAN, information concerning operational parameters utilized by the first IEEE 802.11 WLAN; and
    utilize the information concerning the operational parameters to transmit signals using the second PHY in a manner that does not interfere with wireless devices within the broadcast range of the first IEEE 802.11 WLAN that the first wireless device cannot see.

18. The wireless device of claim 10, wherein the wireless device comprises a first wireless device and wherein the shared wireless medium includes second wireless device communicating over a first channel with a first Electrical and Electronics Engineers (IEEE) 802.11 WLAN access point (AP) utilizing a first IEEE 802.11 protocol, wherein the wireless device is further configured to:
    detect, at the first wireless device, a received signal strength of a signal corresponding to a request to send (RTS) frame transmitted from the second wireless device falls below a signal strength threshold defined by the first IEEE 802.11 protocol;
    detect a clear to send (CTS) frame transmitted by the first IEEE 802.11 WLAN AP in response to the RTS, the CTS frame including a time duration value defining a time period following the CTS frame during which the second wireless device is cleared to transmit signals; and
    use the second PHY to at least one of transmit wireless signals and receive wireless signals using the first channel during the time period.

19. A wireless device, to be operated in a shared wireless medium including one or more wireless local area networks (WLANs), comprising:
    first means for implementing a first Physical layer (PHY) and a first Media Access Channel layer (MAC);
    second means for implementing a second PHY and a second MAC;
    transmitter and receiver circuitry, to transmit and receive wireless signals; and
    one or more antennas, coupled to the transmitter and receiver circuitry;
    wherein the wireless device is configured to,
        use the first means for implementing the first PHY and the first MAC to
            select time slots to access the shared wireless medium; and
        use the second means for implementing the second PHY and second MAC to at least one of transmit wireless signals and receive wireless signals during the selected time slots,
    wherein the selection of time slots does not involve outbound communication with another wireless device using the shared wireless medium.

20. The wireless device of claim 19, wherein the first PHY utilizes a channel having a first radio band, and wherein the second PHY utilizes at least one of:
    one or more frequencies including a frequency that is within the first radio band; and
    a channel having a second radio band that overlaps at least a portion of the first radio band.

21. The wireless device of claim 19, wherein each of the one or more WLANs utilizes at least one PHY and at least one MAC protocol, and wherein the wireless device is further configured to:
    detect a first MAC protocol utilized by a first WLAN utilizing the first PHY; and
    use the first PHY and the first MAC protocol to select time slots during which the second PHY is used to at least one of transmit signals and receive signals.

22. The wireless device of claim 19, wherein at least one of the first means for implementing the first PHY and first MAC and the second means for implementing the second PHY and the second MAC comprises a software-defined radio.

* * * * *